United States Patent
Higuchi et al.

[11] Patent Number: 5,973,469
[45] Date of Patent: Oct. 26, 1999

[54] MOTOR DRIVING APPARATUS

[75] Inventors: Haruhiko Higuchi, Tokorozawa; Masakazu Ichikawa, Soka; Hiroyuki Kihara, Kodaira; Tomomi Murakami, Higashimurayama; Hidetaka Tsuchiya, Akishima, all of Japan

[73] Assignee: Citizen Watch Co., Ltd., Tokyo, Japan

[21] Appl. No.: 08/981,033

[22] PCT Filed: Apr. 11, 1997

[86] PCT No.: PCT/JP97/01276

§ 371 Date: Apr. 13, 1998

§ 102(e) Date: Apr. 13, 1998

[87] PCT Pub. No.: WO97/38487

PCT Pub. Date: Oct. 16, 1997

[30] Foreign Application Priority Data

Apr. 11, 1996 [JP] Japan .................................. 8-098188
Apr. 19, 1996 [JP] Japan .................................. 8-089280

[51] Int. Cl.⁶ .......................................................... H02P 8/00
[52] U.S. Cl. .......................... 318/623; 318/254; 318/701; 318/685
[58] Field of Search .................................. 318/138, 139, 318/245, 254, 293, 600, 636

[56] References Cited

U.S. PATENT DOCUMENTS

| | | | |
|---|---|---|---|
| 4,158,800 | 6/1979 | Jahelka et al. | 318/685 |
| 5,627,444 | 5/1997 | Fulks | 318/701 |
| 5,734,241 | 3/1998 | Okada et al. | 318/366 |
| 5,886,486 | 3/1999 | Jeong et al. | 318/254 |

FOREIGN PATENT DOCUMENTS

| | | |
|---|---|---|
| 53-132721 | 11/1978 | Japan . |
| 2-159999 | 6/1990 | Japan . |
| 5-130800 | 5/1993 | Japan . |

*Primary Examiner*—Paul Ip
*Attorney, Agent, or Firm*—Howell & Haferkamp, L.C.

[57] ABSTRACT

It is an object of this invention to attain reliable starting characteristics and stable rotation performance of a motor in a motor of a phase synchronization driving type. To achieve this object, according to this invention, there is provided a motor driving apparatus having a stepping motor constituted by a stator with at least two poles, a rotor having a permanent magnet with at least two poles, and a driving coil magnetically coupled to the stator, a driving pulse generation means for outputting a driving pulse signal for driving the stepping motor, a driving circuit for supplying a driving current to the driving coil on the basis of the signal from the driving pulse generation means, a voltage detection circuit for detecting a counter electromotive voltage generated upon rotation of the rotor, and a pole position detection means for detecting the pole position of the rotating rotor with respect to the rotor on the basis of a detection signal generated by the voltage detection circuit, the driving pulse generation means controlling the output timing of the driving pulse signal on the basis of the detection signal from the pole position detection means, characterized in that the pole position detection means stops outputting the driving pulse signal on the basis of the detection signal from the voltage detection circuit which is detected during the output period of the driving pulse signal, and outputs a driving pulse signal having a phase opposite to that of the driving pulse signal.

29 Claims, 31 Drawing Sheets

MOTOR DRIVING APPARATUS

This application is 371 of PCT/JP97/01276 filed Apr. 11, 1997.

TECHNICAL FILED

The present invention relates to a motor driving apparatus for enabling high-speed rotation under phase detection control.

BACKGROUND ART

To rotate a motor at a high speed with a large torque is one of the most important factors in terms of an improvement in basic performance of the motor, and has been studied and developed for many years. For example, an electronic timepiece as one of products using motors has been advanced to have many functions in recent years. Timepieces having various functions such as stopwatch function, an alarm function, and a dual time function, in addition to normal time display have been developed and commercially available. These multifunctional timepieces always perform the fast forwarding operation of pointing hands when the system is initialized in an initial state, e.g., in loading the battery, or when the mode is shifted or the hand position is zeroed in normal use. For this reason, high-speed rotation of the motor is very important in terms of an improvement in operability, and the like.

A large-torque motor is indispensable when a flat weight is attached to a motor to use a timepiece as a vibration alarm for informing the time using vibrations generated upon rotation of the motor, or when a disk is attached instead of a pointing hand to a timepiece motor to perform display other than display of the time.

When the motor is rotated at a high speed, even if output of a driving pulse is stopped, the motor may not immediately stop due to the inertia of the motor or parts (e.g., a reduction ring train and a pointing hand in the timepiece) connected to the motor. Normally, to obtain a predetermined number of rotation, a corresponding number of pulses are output. In this case, however, the number of output pulses is not equal to the number of rotation of the motor.

In, e.g., a timepiece pointing hand, this is a fatal defect and leads to a time display error and the like. In addition, the magnetic pole generated at the stator by a driving pulse output in driving the motor next may shift from the pole position of the rotor depending on the pole position of the rotor upon stopping the motor, and the motor may not normally rotate. Therefore, in a system for driving the motor at a high speed, and accurately controlling the rotation speed of the motor to a desired value, it is important that the motor must be stopped at a predetermined position.

A conventional motor driving apparatus will be described below by exemplifying the stepping motor of an electronic timepiece.

FIG. 1 is a view of the arrangement of a motor driving apparatus constituted by a conventional bipolar stepping motor, and FIGS. 2 to 7 are plan views, respectively, showing the positional relationship between the magnetic poles of a stator and a rotor. As a means for converting an electrical signal into a mechanical rotating motion, the bipolar stepping motor is constituted by a driving coil 101, a flat stator 102, and a rotor 103, as shown in FIG. 1. The flat stator 102 has a step 102a, as shown in FIG. 2.

Motor drivers 104a and 104b are arranged to cause a current to flow through the driving coil 101 by changing the potential across the two terminals of the driving coil 101, thereby exciting the flat stator 102. In the bipolar motor shown in FIG. 1, when no current flows through the driving coil 101, the pole position of the rotor 103 with respect to the flat stator 102 is at a statically stable point 110 shown in FIG. 2; when a current flows through the driving coil 101 to excite the flat stator 102, it is at an electromagnetically stable point 111 shown in FIG. 3.

Normally, in the electronic timepiece, a driving pulse signal for changing the potential across the two terminals of the driving coil 101 is output from the motor driver 104a or 104b for 4 to 5 mS to cause a pulse current to flow through the driving coil 101, thereby rotating the rotor 103. When the rotor 103 rotates during the supply of the current to the driving coil 101, and comes to nearly a pole position shown in FIG. 4 with respect to the flat stator 102, the current flowing through the driving coil 101 stops. The rotor 103 rotates to a position in FIG. 5 due to the inertia, is subjected to damped vibration about the statically stable point 110, and finally stops.

After the rotor 103 becomes still, a driving pulse signal is output from, e.g., the motor driver 104a to cause a current to flow through the driving coil 101, thereby exciting the flat stator 102, as shown in FIG. 6. In this case, the rotor 103 rotates through 180° in a rotation direction A shown in FIG. 6. Further, after the rotor 103 becomes still, a driving pulse signal is output from the motor driver 104b on a side opposite to the side from which the previous driving pulse signal is output. Then, the rotor 103 rotates another 180° in the direction A in FIG. 6. If the rotor 103 is rotated by causing a current to flow through the driving coil 101 after the rotor 103 becomes still, it reliably rotates in the direction A shown in FIG. 6.

When the stepping motor is to be rotated at a high speed, the rotor 103 must be rotated at a high speed, as matter of course. At this time, the output interval between driving pulse signals output from the motor drivers 104a and 104b must be shortened.

If the output interval between driving pulse signals is shortened in order to rotate the rotor 103 at a higher speed, the next driving pulse signal must be output before damped vibration of the rotor 103 immediately after its rotation stop.

If the next driving pulse signal is output when the rotor 103 is at a position in FIG. 7 during damped vibration, i.e., the rotor 103 and the electromagnetically stable point 111 have a positional relationship shown in FIG. 7, the rotor 103 undesirably rotates in a direction opposite to the direction A shown in FIG. 6, i.e., opposite to the normal direction. Therefore, to stably rotate the rotor 103, the output interval between driving pulse signals must be set to a time or more required to stabilize damped vibration of the rotor 103 upon rotation within a range not to exceed the electromagnetically stable point 111.

Even the minimum total time of the pulse width of the driving pulse signal and the damped-vibration stabilization time of, i.e., the minimum output period of the driving pulse signal is around 10 mS. This indicates that the output frequency of the driving pulse signal is limited to about 100 Hz in the current driving scheme.

This problem, however, has been solved by the scheme disclosed in Japanese Patent Application No. 6-304440 filed by the present applicant.

FIG. 8 is a circuit diagram showing an example of a driving circuit in a conventional motor driving apparatus, and FIG. 9 is a waveform chart showing the operation of the driving circuit in FIG. 8.

In FIG. 8, reference numeral 25' denotes a driving circuit, which is constituted by motor drivers 1a and 1b. Reference numeral 2 denotes a driving coil; and 41', a counter electromotive voltage detection circuit, which has a bias means 3 and a voltage detection circuit 5. The bias means 3 is constituted by switch means 3a and 3b, and bias resistors 3c and 3d having the same resistance value. Reference numeral 4 denotes a flat stator. The voltage detection circuit 5 is constituted by an inverter 5a, a feedback resistor 5b, and an input resistor 5c. Reference numeral 6 denotes an inverter; 103, a rotor; and 42', a motor constituted by the driving coil 2, the flat stator 4, and the rotor 103.

When a signal OE1 is at "H" level, the motor drivers 1a and 1b buffer-output input signals O1in and O2in, respectively; when the signal OE1 is at "L" level, their outputs are set in a high-impedance state. The switch means 3a and 3b are switches which are turned off when a signal SE output from the inverter 6 is at "L" level, and turned on when the signal SE is at "H" level.

The operation of the circuit in FIG. 8 will be explained with reference to the waveform chart of FIG. 9.

During a period (a) in FIG. 9, since the signal OE1 is at "H" level, and an "H"-level driving pulse signal is output from the motor driver 1a, a current flows through the driving coil 2 to rotate the rotor 103. During this period, both the switch means 3a and 3b are in the OFF state because the signal SE is at "L" level. During a period (b) in FIG. 9, since the signal OE1 is at "L" level, outputs from the motor drivers 1a and 1b are in the high-impedance state, and the switch means 3a and 3b are turned on. The voltage at a terminal X as one terminal of the driving coil 2 is divided into a bias voltage Vb as a voltage ½ the power supply voltage.

A voltage waveform appearing at a terminal Y, as the other terminal of the driving coil 2, during the period (b) in FIG. 9 will be explained.

When outputs from the motor drivers 1a and 1b are in the high-impedance state, the switch means 3a and 3b are ON, and the voltage at the terminal X is set at the level of the bias voltage Vb by the bias resistors 3c and 3d, the voltage value at the terminal Y becomes the bias voltage Vb, similar to the terminal X, as far as the rotor 103 does not rotate and the motor drivers 1a and 1b have no influence. However, immediately after a driving pulse signal is output during the period (a) in FIG. 9, a current flowing through the driving coil 2 is stopped to generate an induced voltage as Vr in FIG. 9. When a driving pulse signal is output to rotate the rotor 103, a counter electromotive voltage Vg is generated upon rotation of the rotor 103, as shown in FIG. 9. The synthesized waveform of these generated voltages appears at the terminal Y. The voltage waveform appearing at the terminal Y is amplified by the voltage detection circuit 5 to have a waveform indicated by Aout in FIG. 9.

In the waveform Aout during the period (b) in FIG. 9, the induced voltage generated from the driving coil 2 is dominant immediately after the driving pulse signal is output. With the lapse of time, the influence of the induced voltage decreases, while the counter electromotive voltage from the rotor 103 becomes dominant.

In FIG. 9, a timing (time P) when the waveform Aout crosses the bias voltage Vb from the positive direction to the negative direction becomes almost equal to a timing when the rotor 103 passes the described-above electromagnetically stable point. If a driving pulse signal is output at this timing from the motor driver 1b on a side opposite to the side from which the previous driving pulse signal is output, the rotor 103 continuously rotates in the forward direction without reversely rotating because its pole position with respect to the flat stator 4 has already passed the electromagnetically stable point.

FIG. 10 shows another prior art in which a counter electromotive voltage generated from a motor is detected by a detection coil wound coaxially with a driving coil. The above-described stepping motor in FIG. 1 further comprises a voltage detection means constituted by a detection coil 105 wound coaxially with the driving coil 101, a differential amplifier 106a for detecting a counter electromotive voltage generated at the detection coil 105 upon rotation of the rotor 103, and a comparator 108 for comparing an output signal from the differential amplifier 106a with a reference voltage Vb, and outputting a signal Aout as the comparison result.

In FIG. 10, reference numeral 25 denotes a driving circuit constituted by motor drivers 104a and 104b; 41, a counter electromotive voltage detection circuit constituted by the detection coil 105 wound on a stator 102, the differential amplifier 106a, and the comparator 108; and 42, a motor constituted by the driving coil 101, the stator 102, and the rotor 103.

In this prior art, the pole position of the rotor 103 with respect to the flat stator 102 during rotation of the rotor 103 is detected by detecting the counter electromotive voltage generated upon rotation of the rotor 103 by using the voltage detection means through the detection coil 105, and the output timing of the driving pulse signal is controlled on the basis of an output from the comparator 108.

The motor having the arrangement of this prior art can be driven similarly to the scheme of detecting the counter electromotive voltage from the motor by using the above-described driving coil 2.in FIG. 8. FIG. 11 shows waveforms in this prior art. In this arrangement, since the DC component of a current flowing through the driving coil 101 is removed in outputting the driving pulse, a voltage waveform appearing on an output from the differential amplifier is the synthesized waveform of Vg and Vr.

In this prior art, the counter electromotive voltage is detected by the detection coil 105 wound coaxially with the driving coil 101. This scheme has already been filed by the present applicant as Japanese Unexamined Patent Publication No. 6-235777.

As described above, according to the driving scheme shown in FIGS. 8 and 9, the output interval between driving pulse signals can be minimized. As a result, the motor can be rotated at a speed about 3 times higher than that of a normal step driving scheme.

In this conventional synchronization driving scheme, the driving pulse conditions at the start of the motor are greatly different from those when the rotation speed is stabilized a predetermined time after the start. Therefore, several kinds of driving pulse signals to be supplied to the driving circuit are prepared in advance. A driving pulse signal having a large width is supplied to the driving circuit at the start of the motor, and the pulse width of the driving pulse signal to be supplied is decreased along with an increase in rotation speed.

However, in a system wherein a motor is attached with a heavy load, and particularly with an unbalanced load like a flat weight for a vibration motor, the driving pulse conditions greatly change depending on the posture of the motor. That is, an energy required at the start is greatly different between a case wherein the rotating shaft of the motor is perpendicular to the gravity, and the flat weight is located at such a position as to start rotation against the gravity, and a case wherein the flat weight is located at such a position as to start rotation in accordance with the gravity. As a result, the width condition of the driving pulse output from the driving circuit changes.

When the motor is driven by the conventional driving scheme, it cannot smoothly start because the pulse width at the start is fixed under predetermined conditions. That is, when the flat weight starts rotation against the gravity, the pulse width may not be long enough to start the motor, and the motor may fail to rotate. When the flat weight starts rotation in accordance with the gravity, the pulse width is excessive, resulting in an increase in power consumption.

In the scheme of driving the motor in synchronism with the phase angle of the rotor, which is a feature of the conventional driving scheme, the next driving pulse signal must be output at the timing when the motor rotates to reach an opposite phase. If a pulse having an excessive width is output, the same driving pulse is kept output even after the motor reaches the opposite phase. As a result, the motor is braked to greatly lower the rotation efficiency.

In the scheme of gradually decreasing the pulse width of a driving pulse signal within a predetermined time after the start of the motor, when the load of the motor is heavy, or when the driving voltage is low, the pulse width is decreased before the rotation speed of the motor sufficiently increases. As a result, not only the acceleration performance of the motor may be lowered, but also the energy necessary for rotation may not be obtained to stop the motor in some cases.

When the pulse width of the driving pulse signal is not sufficiently decreased with respect to the rotation speed, i.e., when a driving pulse signal having an excessive pulse width is output, the signal Aout output from the voltage detection circuit 5 in FIG. 8 becomes the one shown in FIG. 12. That is, the counter electromotive voltage generated from the motor shifts to the negative side with respect to the potential Vb before the influence of the induced voltage generated after outputting a driving pulse signal disappears. For this reason, no next driving pulse signal which is supposed to be output at the time Q is output. As a result, the motor stops, or even if it does not stop, the rotation speed does not increase.

DISCLOSURE OF INVENTION

It is an object of the present invention to solve the above problems, and attain reliable starting characteristics and stable rotation performance of a motor.

To solve the above problems, according to the present invention, as claim 1, there is provided a motor driving apparatus comprising a stepping motor constituted by a stator with at least two poles, a rotor having a permanent magnet with at least two poles, and a driving coil magnetically coupled to the stator, driving pulse generation means for outputting a driving pulse signal for driving the stepping motor, a driving circuit for supplying a driving current to the driving coil on the basis of the signal from the driving pulse generation means, a voltage detection circuit for detecting a counter electromotive voltage generated upon rotation of the rotor, and pole position detection means for detecting a pole position of the rotating rotor with respect to the rotor on the basis of a detection signal generated by the voltage detection circuit, the driving pulse generation means controlling an output timing of the driving pulse signal on the basis of the detection signal from the pole position detection means, characterized in that the pole position detection means stops outputting the driving pulse signal on the basis of the detection signal from the voltage detection circuit which is detected during an output period of the driving pulse signal, and outputs a driving pulse signal having a phase opposite to that of the driving pulse signal.

As claim 2 in claim 1, it is characterized in that the pole position is detected by detecting the counter electromotive voltage generated at a detection coil coaxially wound on the driving coil by using the pole position detection means.

As claim 3 in claim 2, it is characterized in that the pole position is detected on the basis of a result of comparison between the counter electromotive voltage detected by the pole position detection means and a predetermined potential.

As claim 4 in claim 3, it is characterized in that the predetermined potential for detecting the pole position includes a plurality of set potentials.

As claim 5 in claim 1, it is characterized in that the voltage detection circuit is constituted by bias means for biasing a potential level at one terminal of the driving coil to an intermediate potential of a power supply voltage, and a voltage detection circuit for detecting a counter electromotive voltage generated at the other terminal of the driving coil, the driving pulse generation means outputs a driving pulse signal constituted by an intermittent pulse group having a plurality of idle periods, and the pole position detection means stops the driving pulse signal on the basis of a result of comparison between the detection signal from the voltage detection circuit which is detected during the plurality of idle periods, and the intermediate potential, and outputs a driving pulse signal having a phase opposite to that of the stopped driving pulse.

As claim 6 in claim 5, it is characterized in that the pole position is detected on the basis of crossing of the counter electromotive voltage detected by the pole position detection means over a predetermined potential.

As claim 7 in claim 6, it is characterized in that the predetermined potential for detecting the pole position includes a plurality of set potentials.

As claim 8 in claim 5, it is characterized in that the driving pulse signal constituted by the intermittent pulse group is constituted by a plurality of pulse groups having different pulse widths.

As claim 9 in claim 8, it is characterized in that the driving pulse signal constituted by the intermittent pulse group is constituted by a first pulse having a large pulse width, and a second pulse group having a pulse width smaller than that of the first pulse.

As claim 10 in claim 9, it is characterized in that the pulse width of the first pulse changes in accordance with a rotation speed of the rotor.

As claim 11 in claim 9, it is characterized in that the pulse width of the first pulse changes in accordance with the output number of driving pulses upon start of the rotor.

As claim 12 in claim 9, it is characterized in that the pulse width of the second pulse changes in accordance with a rotation speed of the rotor.

As claim 13 in claim 9, it is characterized in that the pulse width of the second pulse changes in accordance with the output number of driving pulses upon start of the rotor.

As claim 14 in claim 10, it is characterized in that the first pulse changes to decrease the pulse width along with an increase in rotation speed of the rotor.

As claim 15 in claim 11, it is characterized in that the first pulse changes to decrease the pulse width along with an increase in number of output driving pulses upon the start of the rotor.

As claim 16 in claim 12, it is characterized in that the second pulse changes to decrease the pulse width along with an increase in rotation speed of the rotor.

As claim 17 in claim 13, it is characterized in that the second pulse changes to decrease the pulse width along with an increase in number of output driving pulses upon the start of the rotor.

As claim 18 in claim 5, it is characterized in that the idle period widths of the plurality of idle periods of the driving pulse signal constituted by the intermittent pulse group change in accordance with a rotation speed of the rotor.

As claim 19 in claim 5, it is characterized in that the idle period widths of the plurality of idle periods of the driving pulse signal constituted by the intermittent pulse group change in accordance with the number of output pulses upon start of the rotor.

As claim 20 in claim 18, it is characterized in that the idle period widths change to decrease the widths along with an increase in rotation speed of the rotor.

As claim 21 in claim 19, it is characterized in that the idle period widths change to decrease the widths along with an increase in number of output driving pulses upon the start of the rotor.

As claim 22 in claim 1, it is characterized in that the motor driving apparatus comprises a timer circuit for measuring a predetermined time after the driving pulse generation means outputs a starting pulse, and then generating a timer signal, and when no detection signal is generated by the pole position detection means the predetermined time after output of the starting pulse is started, the driving pulse generation means stops outputting the starting pulse in accordance with a timer signal output from the timer circuit, and outputs a driving pulse signal having a phase opposite to that of the starting pulse.

As claim 23, there is provided a motor driving apparatus comprising a stepping motor constituted by a stator with at least two poles, a rotor having a permanent magnet with at least two poles, and a driving coil magnetically coupled to the stator, driving pulse generation means for outputting a driving pulse signal for driving the stepping motor, a driving circuit for supplying a driving current to the driving coil on the basis of the signal from the driving pulse generation means, a voltage detection circuit for detecting a counter electromotive voltage generated upon rotation of the rotor, and pole position detection means for detecting a pole position of the rotating rotor with respect to the rotor on the basis of a detection signal generated by the voltage detection circuit, the driving pulse generation means controlling an output timing of the driving pulse signal on the basis of the detection signal from the pole position detection means, characterized in that the motor driving apparatus further comprises a timer circuit for generating a timer signal a predetermined time after the driving pulse generation means outputs the driving pulse signal, and when no detection signal is generated by the pole position detection means the predetermined time after output of the driving pulse signal is started, the driving pulse generation means sets a pulse width of a driving pulse signal to be output next to smaller than that of the previously output driving pulse signal.

As claim 24 in claim 23, it is characterized in that, when no detection signal is generated from the pole position detection means the predetermined time after output of the driving pulse signal is started, the driving pulse generation means outputs a compensation pulse signal having a polarity opposite to that of the driving pulse signal.

As claim 25 in claim 24, it is characterized in that the compensation pulse signal has a pulse width smaller than that of the driving pulse signal.

As claim 26 in claim 1 or 23, it is characterized by further comprising damping pulse generation means for outputting a damping pulse signal in order to stop rotating the stepping motor, the damping pulse generation means controlling an output timing of the damping pulse signal on the basis of the detection signal from the pole position detection means.

As claim 27 in claim 26, it is characterized in that the damping pulse signal is output in a direction in which the stator is excited to a polarity opposite to a magnetic pole of the rotor.

As claim 28 in claim 26, it is characterized in that the damping pulse signal is output with a pulse width larger than that of the driving pulse signal for driving the stepping motor.

BEST MODE OF CARRYING OUT THE INVENTION

The first embodiment of the present invention will be described below with reference to the accompanying drawings.

Figure 13:
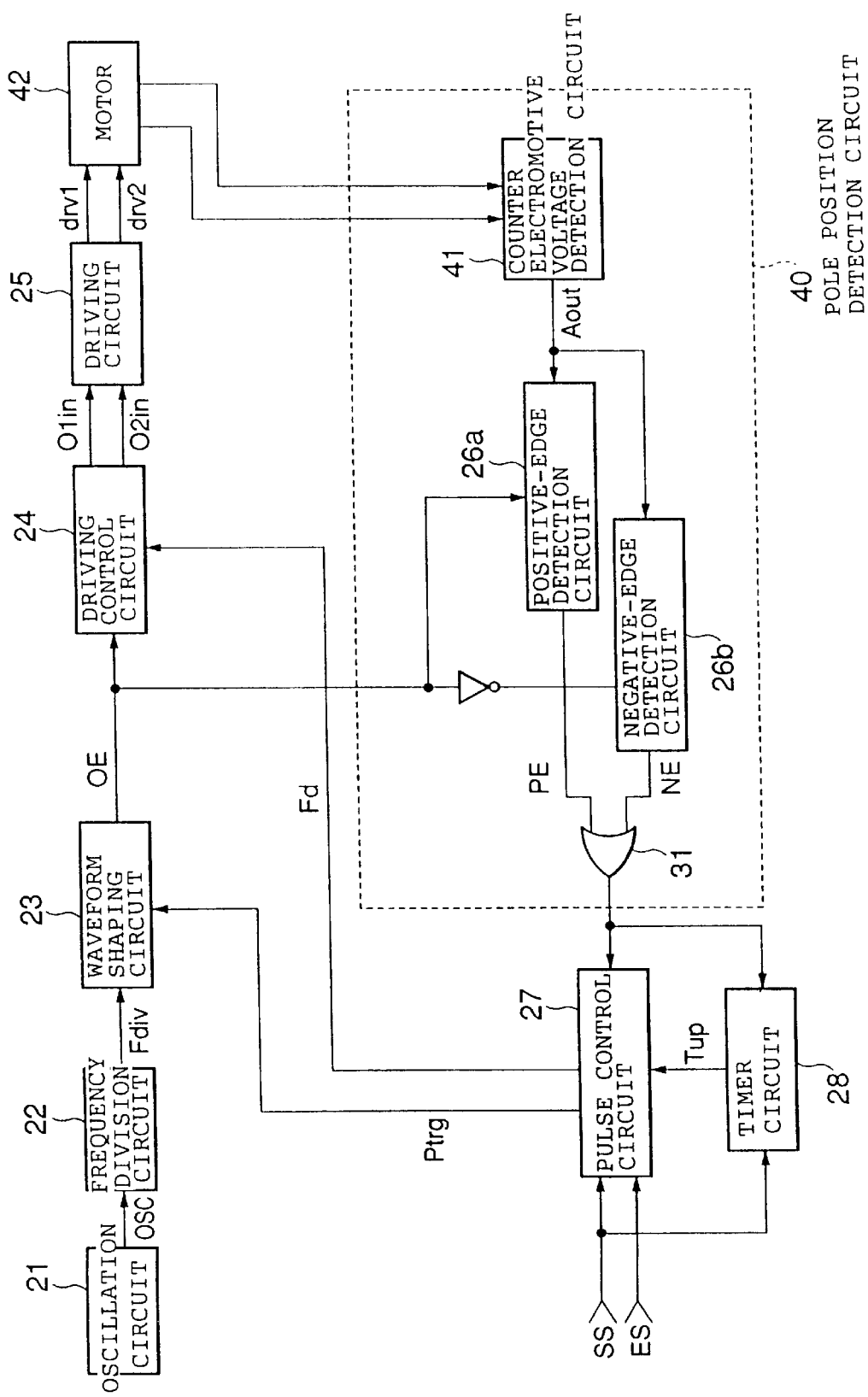
FIG. 13 is a block diagram showing the first embodiment of a driving system in a motor driving apparatus of the present invention.
Figure 14:
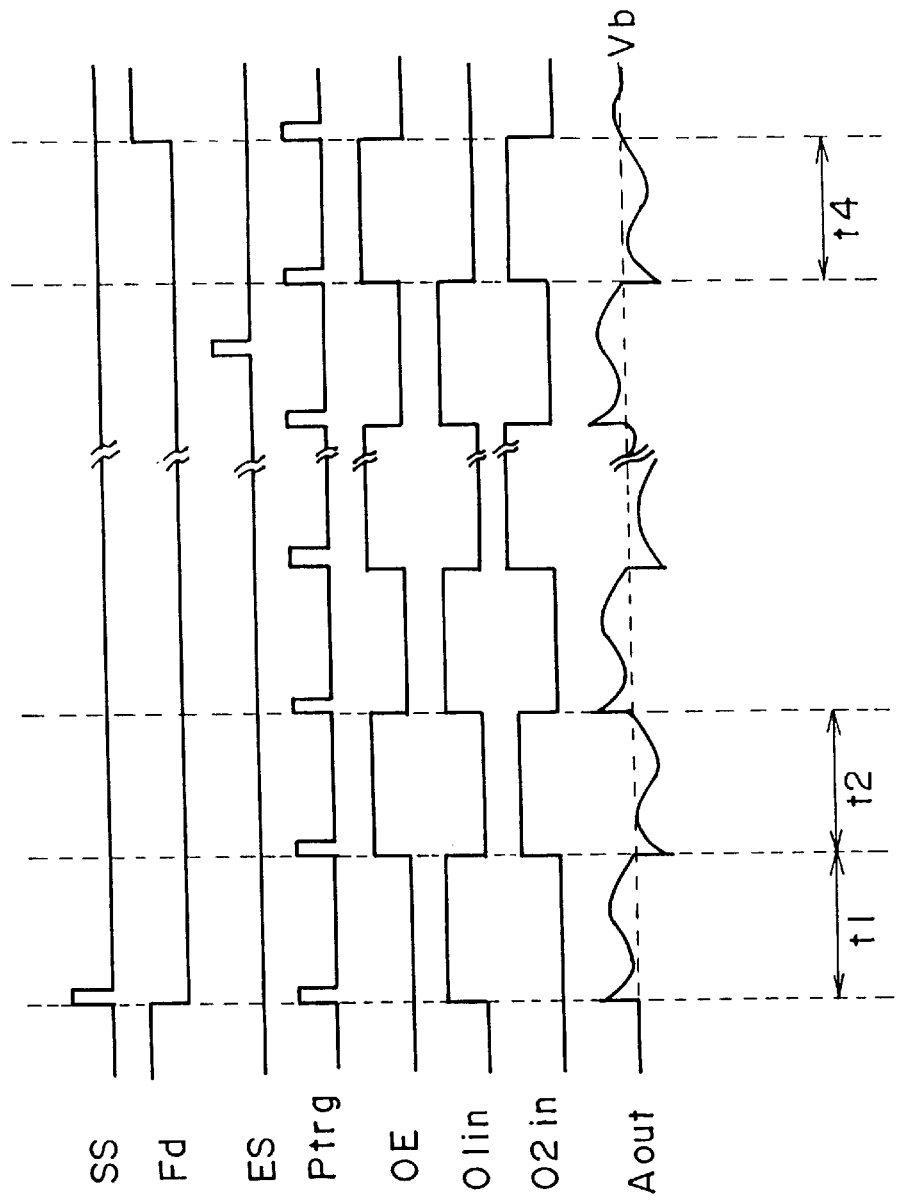
FIG. 14 is a waveform chart showing the operation of the driving system in FIG. 13.

FIG. 13 is a block diagram showing the first embodiment of a driving system in a motor driving apparatus of the present invention, and FIG. 14 is a waveform chart showing the operation of the driving system in FIG. 13.

In FIG. 13, reference numeral 21 denotes an oscillation circuit for oscillating a reference frequency signal OSC; 22, a frequency division circuit for outputting a signal Fdiv obtained by dividing the reference frequency OSC; 23, a waveform shaping circuit for shaping a signal OE serving as a base signal for a driving pulse signal for driving a motor 42; 24, a driving control circuit for outputting a signal O1in or O2in as the driving pulse signal on the basis of signals OE and Fd; 25, a driving circuit for outputting a signal drv1 or drv2 for driving the motor 42 on the basis of the signals O1in and O2in; 26a, a positive-edge detection circuit for outputting a positive-edge detection signal PE when a signal Aout detected by a counter electromotive voltage detection circuit 41 crosses a reference potential Vb in the positive direction (from the negative direction to the positive direction); 26b, a negative-edge detection circuit for outputting a negative-edge detection signal NE when the signal Aout detected by the counter electromotive voltage detection circuit 41 crosses the reference potential Vb in the negative direction (from the positive direction to the negative direction); 31, an OR circuit for outputting an OR between the positive- and negative-edge detection signals PE and NE; and 28, a timer circuit for measuring a predetermined time after the rise of the driving pulse signal. Reference numeral 27 denotes a pulse control circuit, which outputs the signal Fd for controlling the operation/non-operation of the driving control circuit 24, and a signal Ptrg for controlling the output timing of the signal OE output from the waveform shaping circuit 23. The driving circuit 25, the counter electromotive voltage detection circuit 41, and the motor 42 have the arrangements in FIG. 10 described in the prior art. Reference numeral 40 denotes a pole position detection circuit constituted by the positive-edge detection circuit 26a, the negative-edge detection circuit 26b, the OR circuit 31, and the counter electromotive voltage detection circuit 41.

The operation will be described below with reference to FIG. 14.

Figure 10:
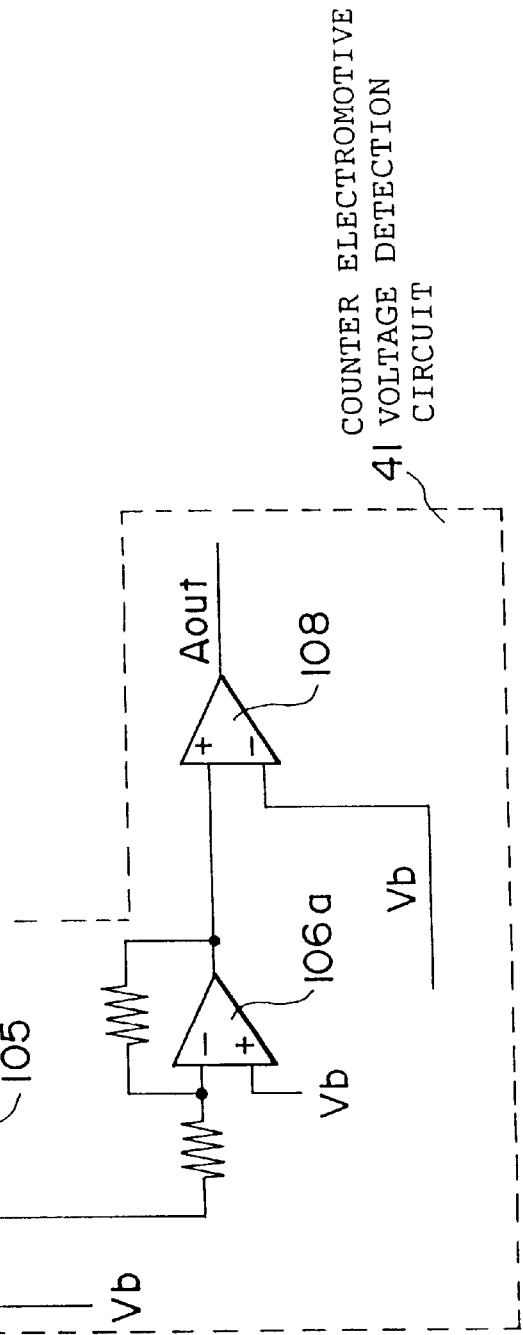
FIG. 10 is a circuit diagram of a driving circuit in a motor driving apparatus of another prior art.
Figure 11:
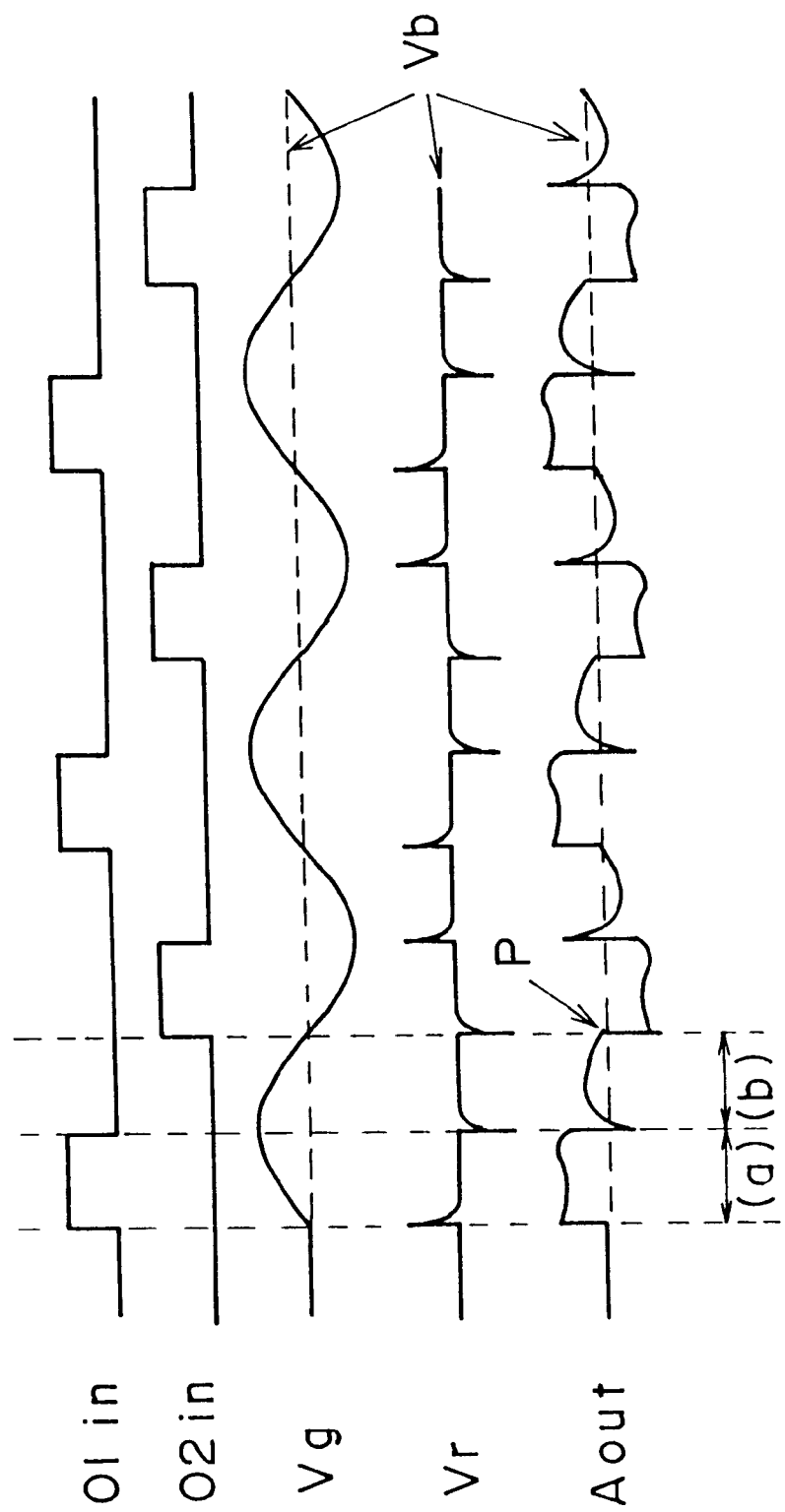
FIG. 11 is a waveform chart showing the operation of the driving circuit in FIG. 10.
Figure 12:
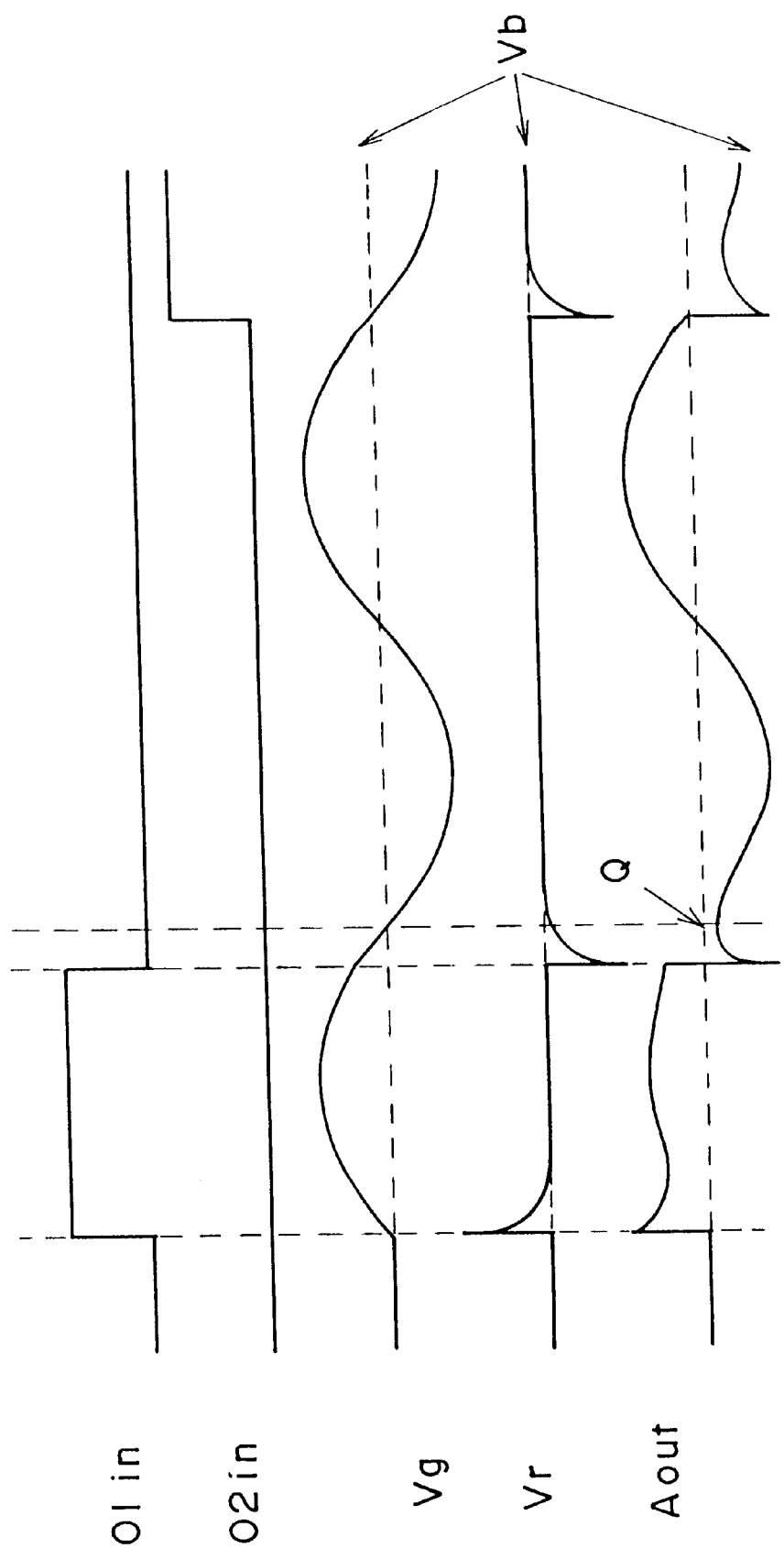
FIG. 12 is a waveform chart showing the operation of the driving circuit in FIG. 8.

When this circuit system of the motor driving apparatus is inoperative, i.e., when the rotor 103 shown in FIG. 10 does not rotate, the signal Fd output from the pulse control circuit 27 is at "H" level. In this state, since both the outputs O1in and O2in from the driving control circuit 24 to the driving circuit 25 are at "L" level, both outputs from the motor drivers 104a and 104b are at "L" level.

In rotating the rotor 103, when a starting signal SS is externally input to the pulse control circuit 27, the signal Fd output from the pulse control circuit 27 changes to "L" level. Upon reception of the signal SS, the timer circuit 28 starts a timer operation. When the signal Fd changes to "L" level, and the signal OE changes to "H", the driving control circuit 24 outputs an "H" signal O1in for an "L"-level signal OE, or outputs an "H" signal O2in for an "H"-level signal OE. In FIG. 14, the signal O1in is at "H" because the signal OE immediately after the signal SS is output is at "L".

The operations of the positive- and negative-edge detection circuits 26a and 26b will be described. The positive-edge detection circuit 26a becomes active when the signal OE is at "H" level, and outputs the positive-edge detection signal PE when the signal Aout crosses the bias voltage Vb in the positive direction. The negative-edge detection circuit 26b becomes active when the signal OE is at "L" level, and outputs the negative-edge detection signal NE when the signal Aout crosses the bias voltage Vb in the negative direction while the signal OE is at "L" level.

During a period t1 in FIG. 14, the negative-edge detection circuit 26b is operative because the signal OE is at "L". If the output signal O1in from the driving control circuit 24 is kept at "H", the signal Aout as a signal from the driving circuit 25 has a waveform during the period t1 in FIG. 14.

During the period t1, when the signal Aout crosses the potential of the bias voltage Vb from the positive direction to the negative direction, the negative-edge detection circuit 26b outputs the negative-edge detection signal NE. Upon reception of the negative-edge detection signal NE through the OR circuit 31, the pulse control circuit 27 outputs the signal Ptrg. When the timer circuit 28 similarly receives the negative-edge detection signal NE through the OR circuit 31, it resets its timer operation and stops.

The waveform shaping circuit 23 changes the signal OE to "H" level during a period t2 in FIG. 14 in synchronism with the rise of the signal Ptrg. The driving control circuit 24 changes the signal O2in to "H" level while the signal OE is at "H".

During the period t2 in FIG. 14, the positive-edge detection circuit 26a receives the signal Aout, and outputs the positive-edge detection signal PE when the level of the signal Aout crosses the bias voltage Vb from the negative direction to the positive direction. Upon reception of the positive-edge detection signal PE through the OR circuit 31, the pulse control circuit 27 outputs the signal Ptrg. The same operation is repeatedly executed to continuously rotate the rotor 103.

To stop rotating the rotor 103, a stop signal ES is externally input to the pulse control circuit 27. When the pulse control circuit 27 receives the positive- or negative-edge detection signal PE or NE immediately upon reception of the stop signal ES, it outputs the last Ptrg. In the example of FIG. 14, the pulse control circuit 27 receives the negative-edge detection signal NE, and outputs the signal Ptrg.

During a period t4 in FIG. 14, an "H"-level signal O2in is output to make the positive-edge detection circuit 26a active, and the positive-edge detection signal PE is output at a timing when the signal Aout crosses the bias voltage Vb from the negative direction to the positive direction. When the pulse control circuit 27 receives the positive-edge detection signal PE upon reception of the stop signal ES, it changes the signal Fd to "H" level, and fixes outputs from the motor drivers 104a and 104b to "L" level, completing the operation of the circuit.

The above-described first embodiment assumes that the rotor 103 is adjusted to a rotation pole position by the first pulse at the start of outputting an "H"-level signal O1in. In practical use, however, the phase of the driving pulse signal does not always coincide with the pole position of the rotor 103. Particularly when a load having a large inertia such as a vibration alarm is attached, the motor may be kept inertially rotated even after the rotation of the motor is stopped. In such a case, the final pole position is indefinite.

The above situation is taken into consideration, and how the system of the present invention operates when the motor fails to rotate by the first pulse will be described with reference to FIGS. 13 and 15.

Figure 15:
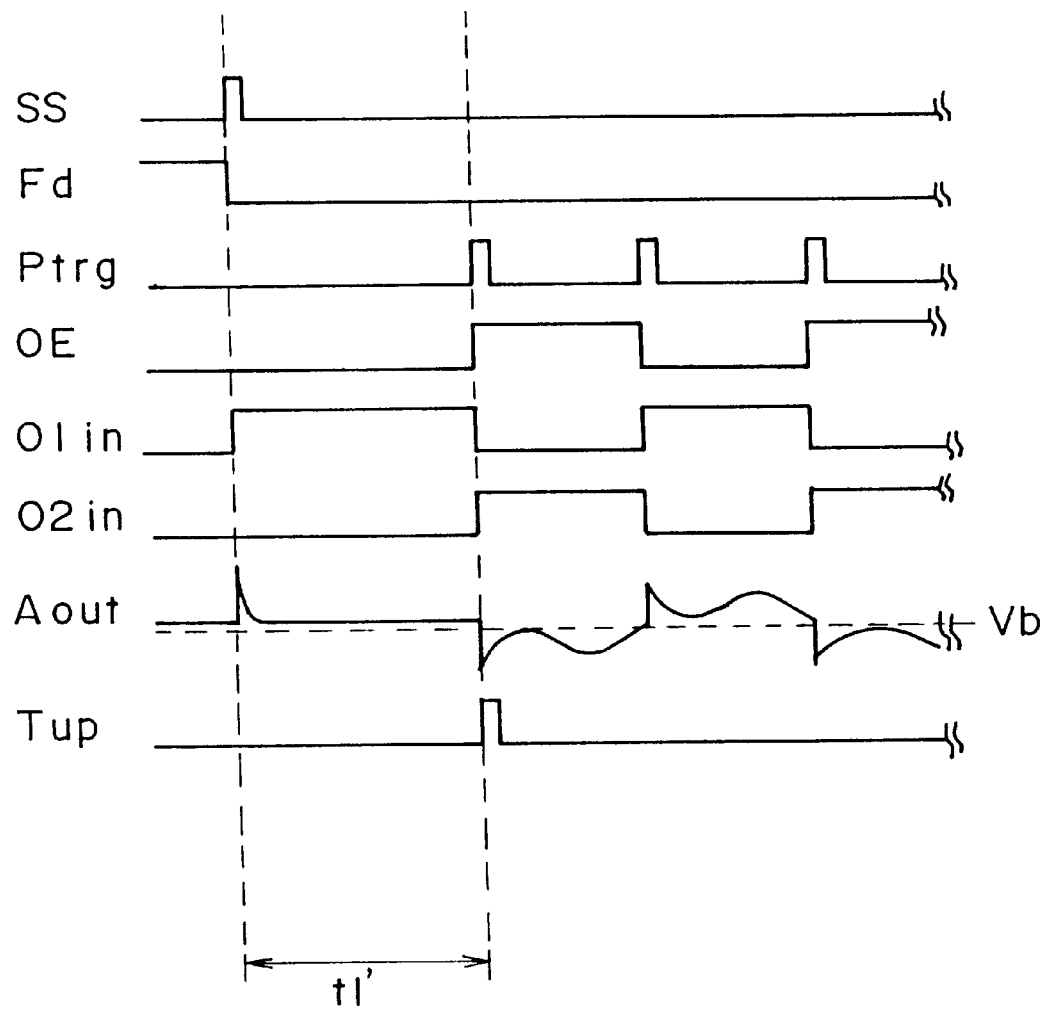
FIG. 15 is a waveform chart showing the states of respective portions of the circuit when the motor fails to rotate by the first pulse.

FIG. 15 is a waveform chart showing the states of the respective portions of the circuit when the motor fails to rotate by the first pulse.

Figure 16:
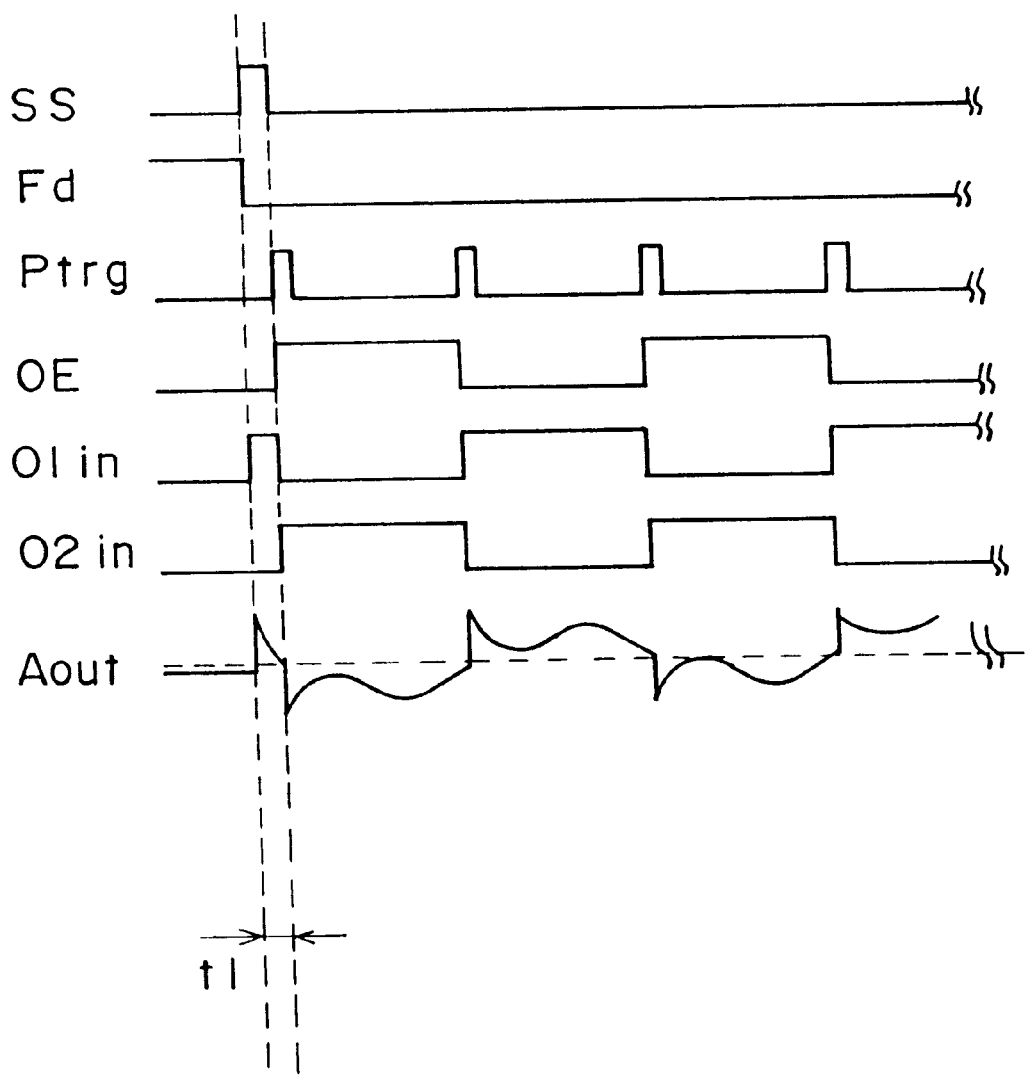
FIG. 16 is a waveform chart showing the states of the respective portions of the circuit when the motor fails to rotate by the first pulse.

When the motor fails to rotate by the first pulse, the signal Aout output from the driving circuit 25 is in a state shown in FIG. 15 or 16. That is, since the motor does not rotate, a counter electromotive voltage Vr generated upon normal rotation of the motor is rarely generated. As a result, the signal Aout depends on only a voltage induced at a detection coil upon outputting a driving pulse signal. In this case, when the influence of the induced voltage disappears, the potential difference across the two terminals of the differential amplifier 106a shown in FIG. 10 should become basically 0. In practice, however, a certain potential difference is generated, so that the potential of the signal Aout is slightly higher or lower than the bias voltage Vb.

When the potential of the signal Aout after the influence of the induced voltage disappears is higher than Vb, the signal Aout does not cross the level Vb from the positive in the negative direction even if the driving pulse signal is continuously output. For this reason, no signal Ptrg serving as the output timing of the next driving pulse signal is generated. In this system, when the signal SS is input, a starting driving pulse signal is output, and the timer operation of the timer circuit 28 is performed. When no positive- or negative-edge detection signal is output from the pole position detection circuit 40 even after a predetermined time (t1' in FIG. 15), the timer circuit 28 outputs a pseudo detection signal Tup, and stops its timer operation. Upon reception of the signal Tup, the pulse control circuit 27 outputs the signal Ptrg. Accordingly, an "H"-level signal O2in is immediately output, i.e., the next pulse signal having a polarity opposite to that of the first driving pulse signal is output, thereby rotating the rotor 103. The subsequent operation is performed under the same control as that in the above-described case wherein the motor is rotated by the first pulse.

When the potential of the signal Aout after the influence of the induced voltage is lower than Vb, the waveform of the signal Aout crosses Vb from the positive direction to the negative direction immediately after the influence of the induced voltage disappears, so that the negative-edge detection circuit 26b immediately outputs the signal NE. Upon reception of the signal NE, the timer circuit 28 stops its timer operation. The pulse control circuit 27 outputs the signal Ptrg. The subsequent operation is performed under the same control as that in the above-described case wherein the motor is rotated by the first pulse.

In the above-described system, 180°-rotation of the motor can be recognized by detecting the counter electromotive voltage generated from the motor during output of a driving pulse signal. If the next pulse is output at this timing, the motor can be certainly driven with a high efficiency without reducing its rotation power.

According to the first embodiment, since no driving pulse signal idle period for detecting the pole position is required, unlike in the prior art, the interval between the driving pulse signal and the next driving pulse signal can be eliminated to stably drive the motor at a high speed. In addition, the motor can be reliably started regardless of the pole position of the rotor 103 at the start.

Figure 17:
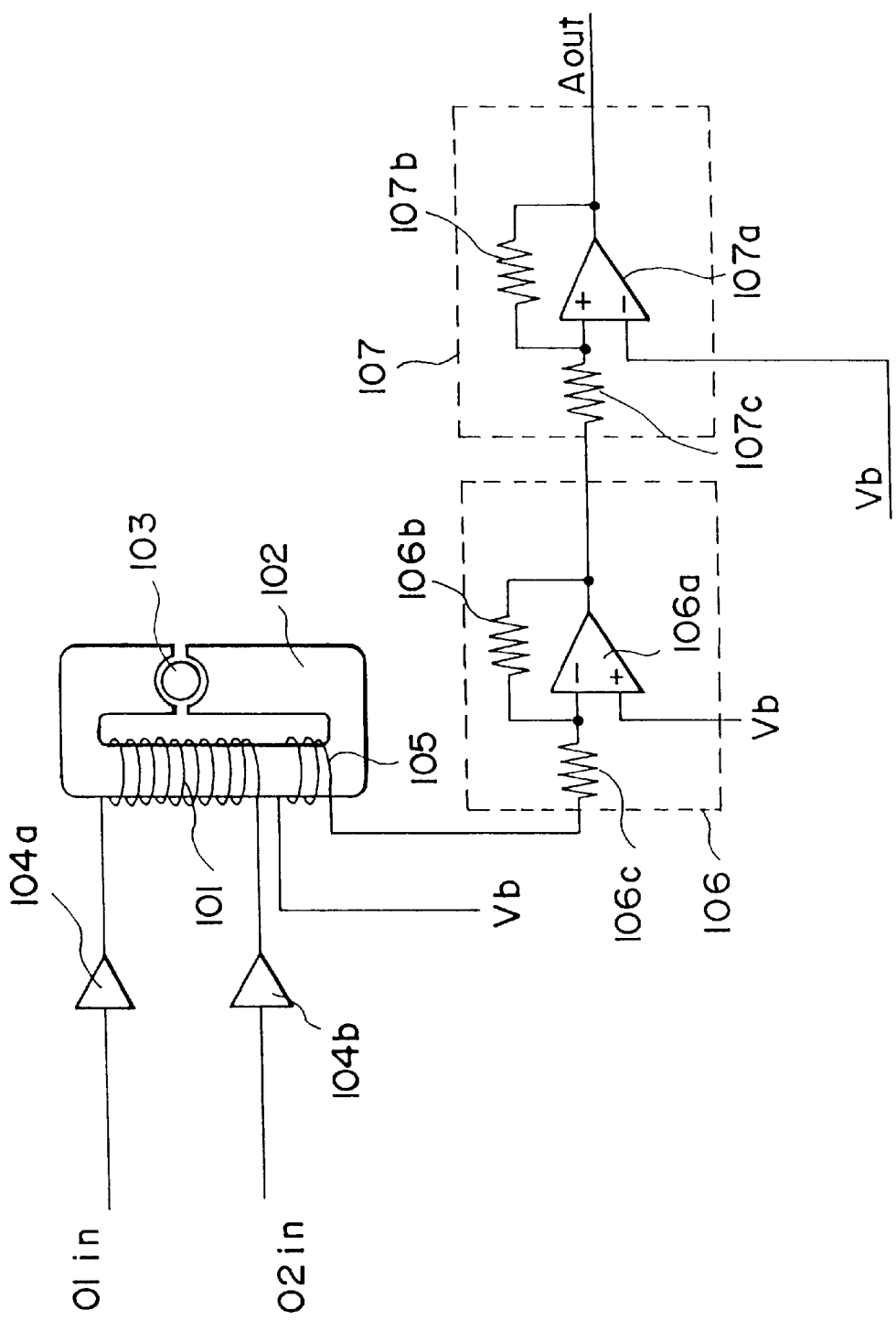
FIG. 17 is a circuit diagram when a hysteresis comparator is applied to the driving circuit in FIG. 10.

In FIG. 10, the voltage detection means constituted by the comparator 108 for comparing an output signal from the differential amplifier 106a with the reference voltage Vb, and outputting a signal as the comparison result is added. Alternatively, as shown in FIG. 17, a hysteresis comparator may be constituted by connecting a circuit 107 constituted by a differential amplifier 107a, a feedback resistor 107b, and an input resistor 107c to a circuit 106 constituted by a differential amplifier 106a, a feedback resistor 106b, and an input resistor 106c, and a hysteresis may be arranged at the reference potential for checking crossing of the counter electromotive voltage in order to detect the pole position.

If the hysteresis comparator is arranged in this manner to delay the timing for detecting whether the counter electromotive voltage crosses the reference potential, a malfunction caused by the influence of an external magnetic field or the like can be prevented. Further, even when a physical shock or the like is applied to the motor, the motor can rotate very stably.

A case wherein the present invention is applied to a motor driving apparatus constituted such that a driving coil is also used as a detection coil for detecting the pole position to detect the counter electromotive from the motor will be described as the second embodiment with reference to the accompanying drawings.

Figure 18:
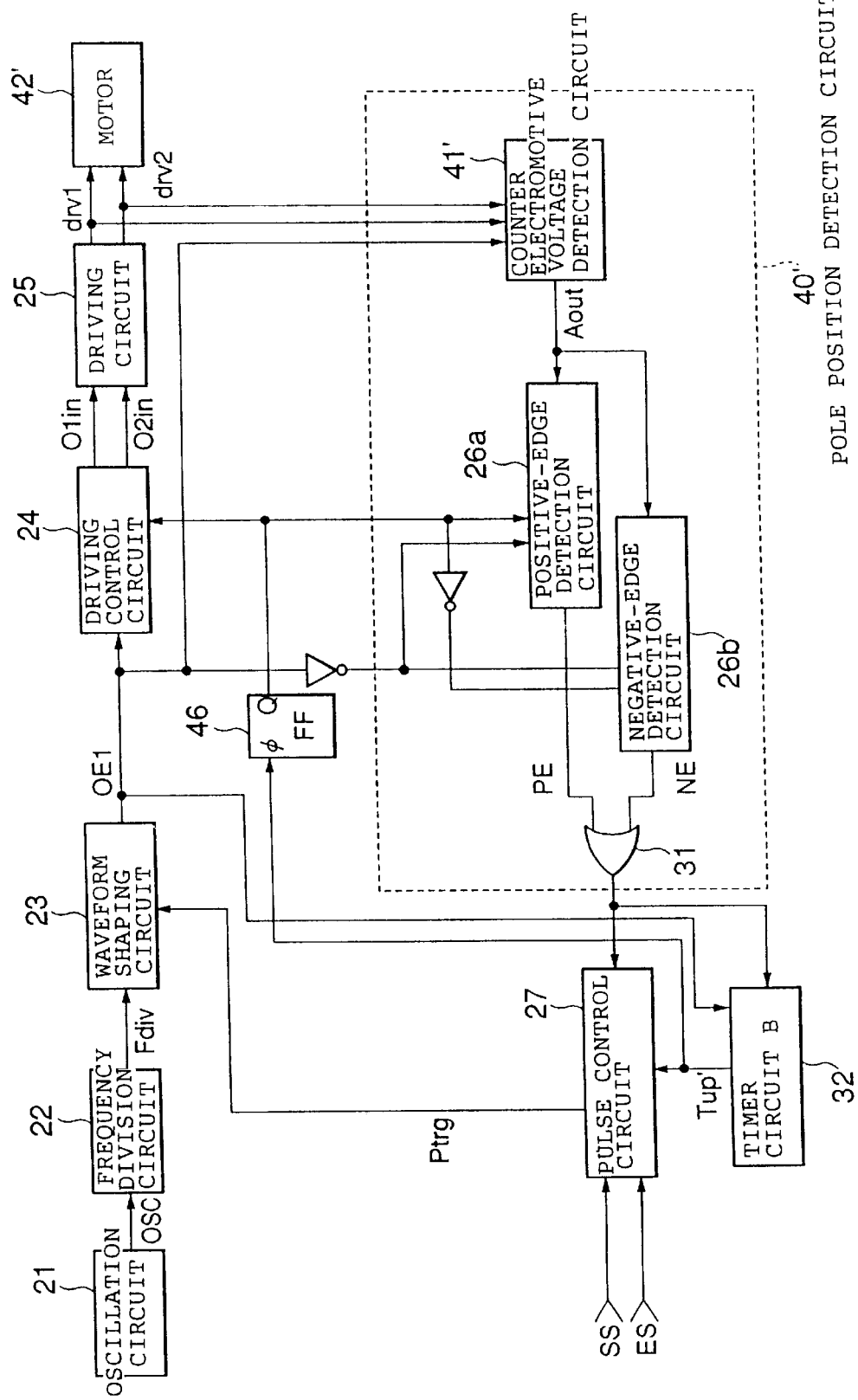
FIG. 18 is a block diagram showing the second embodiment of the driving system in the motor driving apparatus of the present invention.
Figure 19:
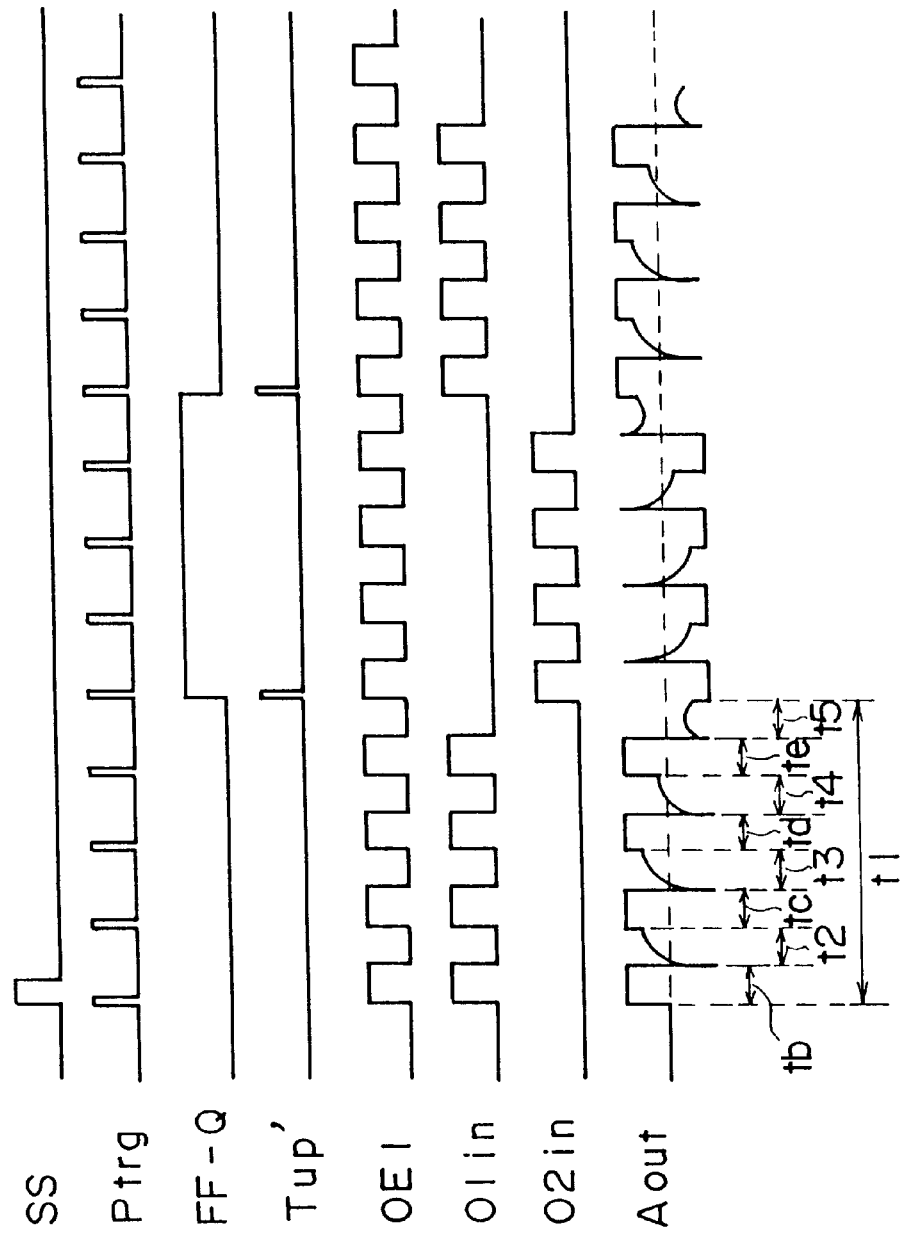
FIG. 19 is a waveform chart showing the operation of the driving system in FIG. 18.
Figure 20:
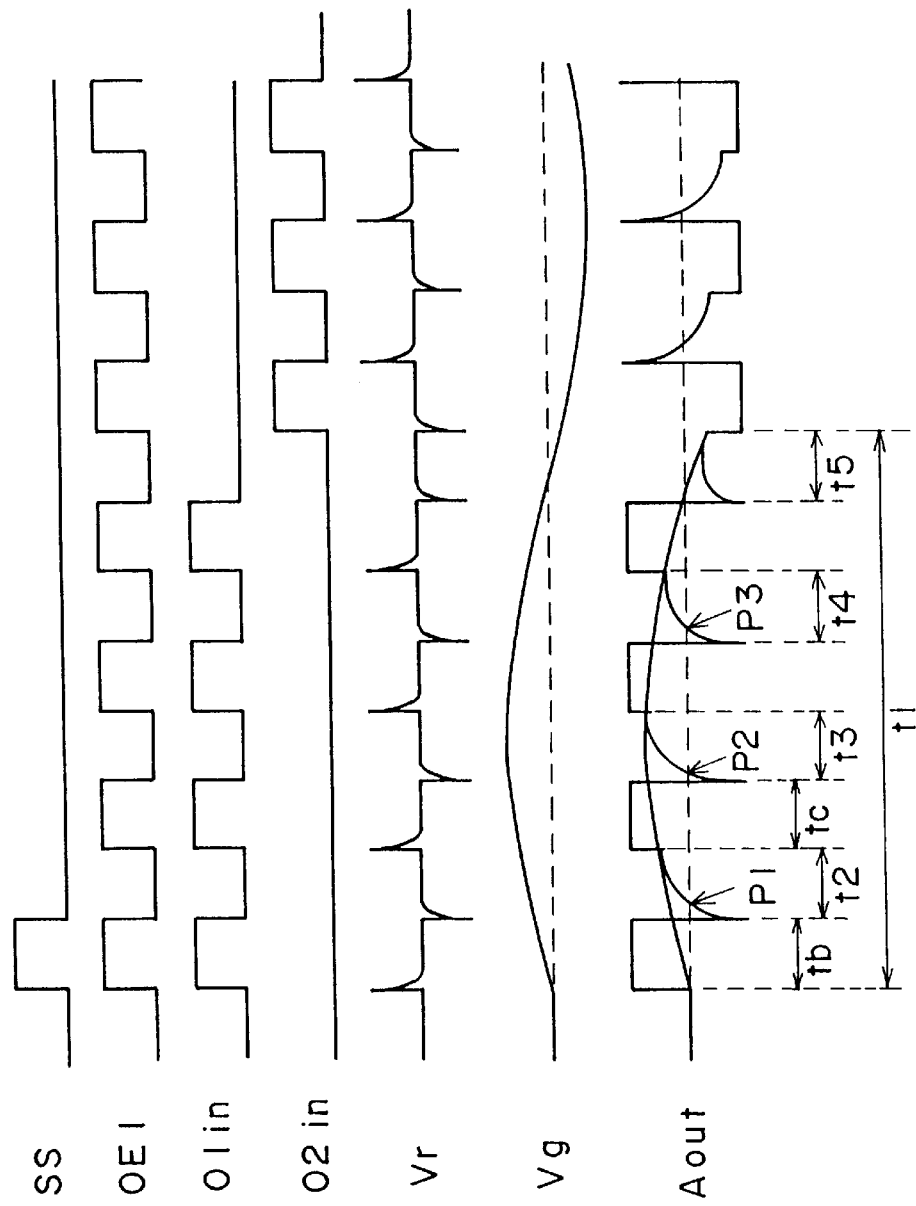
FIG. 20 is a waveform chart showing the operation of the driving system in FIG. 18.

FIG. 18 is a block diagram showing the second embodiment in which the above-described system in FIG. 13 is slightly improved to enable detection of the counter electromotive voltage from the motor even during output of the driving pulse signal. FIGS. 19 and 20 are waveform charts showing the operation in FIG. 18. FIG. 20 shows waveforms enlarged along the timing axis, compared to FIG. 19.

In FIG. 18, reference numeral 32 denotes a timer circuit B for measuring a predetermined time after the signal OE1 changes to "L", and outputting a signal Tup' when no positive- or negative-edge detection signal PE or NE is received within this predetermined time; 46, a flip-flop circuit for inverting an output signal Q each time it receives the signal Tup'; and 40', a pole position detection circuit constituted by a positive-edge detection circuit 26a, a negative-edge detection circuit 26b, an OR circuit 31, and a counter electromotive voltage detection circuit 41'. A waveform shaping circuit 23 intermittently controls the driving pulse signal, and outputs the signal OE1 as a signal for controlling the pole position detection circuit 40' and the timer circuit B 32 each time the circuit 23 receives the signal Ptrg output from a pulse control circuit 27. A driving control circuit 24 is constituted to switch and output the signals O1in and O2in on the basis of the output signal Q from the flip-flop circuit 46. A driving circuit 25', the counter electromotive voltage detection circuit 41', and a motor 42' have the same arrangements as those in FIG. 8 described in the prior art. The remaining constituent elements are the same as those in FIG. 13, and a description thereof will be omitted.

Figure 1:
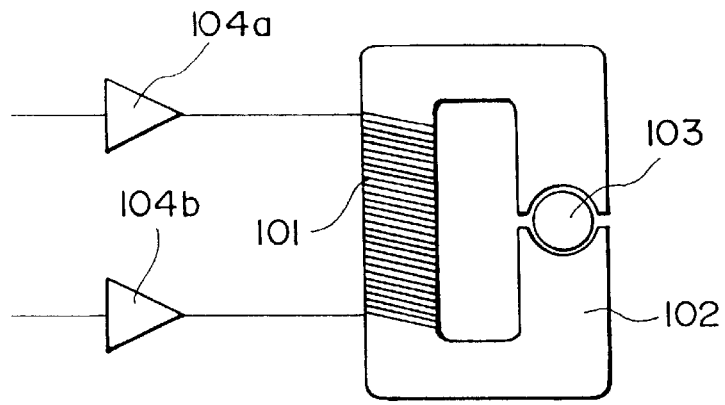
FIG. 1 is a circuit diagram of the driving portion of a conventional motor driving apparatus.
Figure 2:
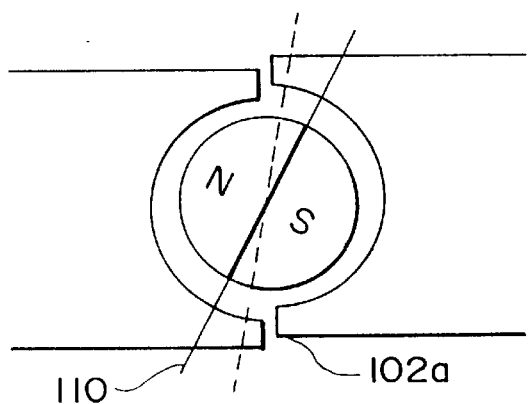
FIG. 2 is a plan view showing the statically stable point of a bipolar stepping motor in FIG. 1.
Figure 3:
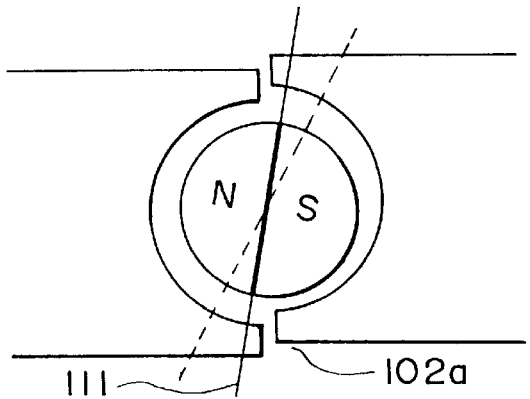
FIG. 3 is a plan view showing the electromagnetically stable point of the bipolar stepping motor in FIG. 1.
Figure 4:
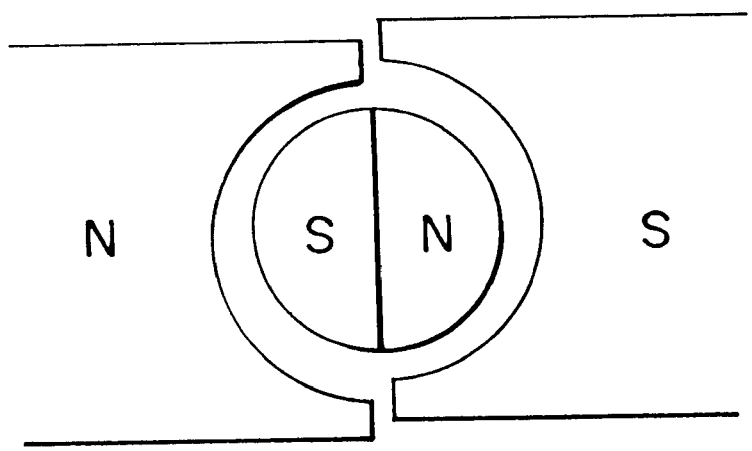
FIG. 4 is a plan view showing the pole position during rotation of the bipolar stepping motor in FIG. 1.
Figure 5:
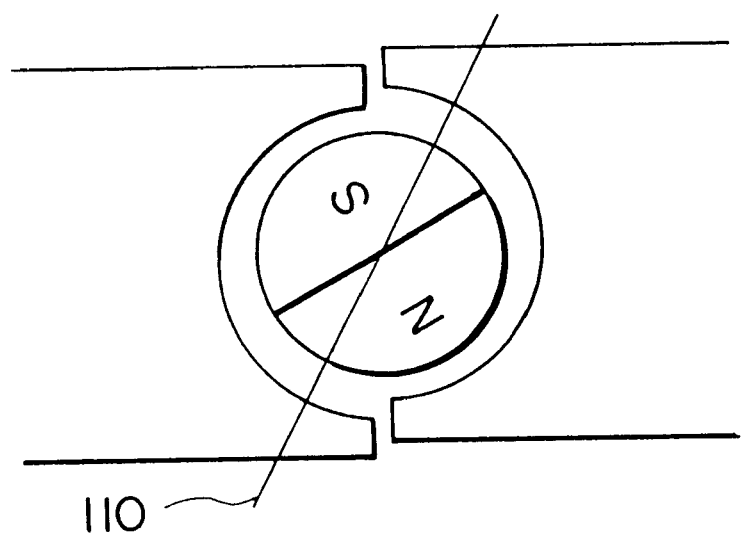
FIG. 5 is a plan view showing the rotation direction of the bipolar stepping motor in FIG. 1.
Figure 6:
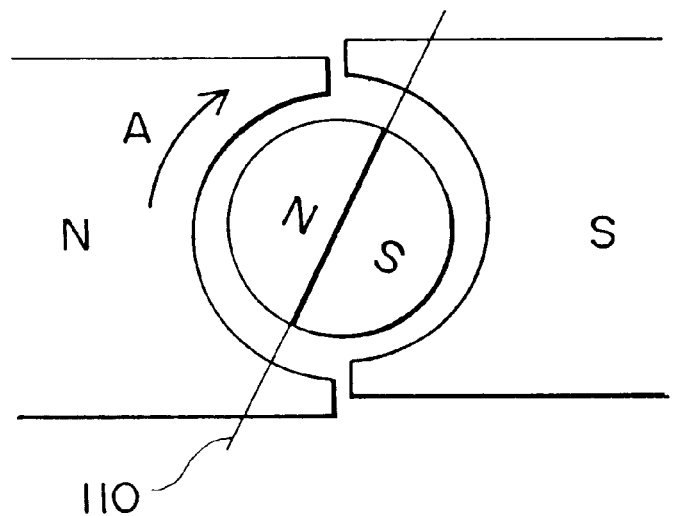
FIG. 6 is a plan view showing the rotation direction of the bipolar stepping motor in FIG. 1.
Figure 7:
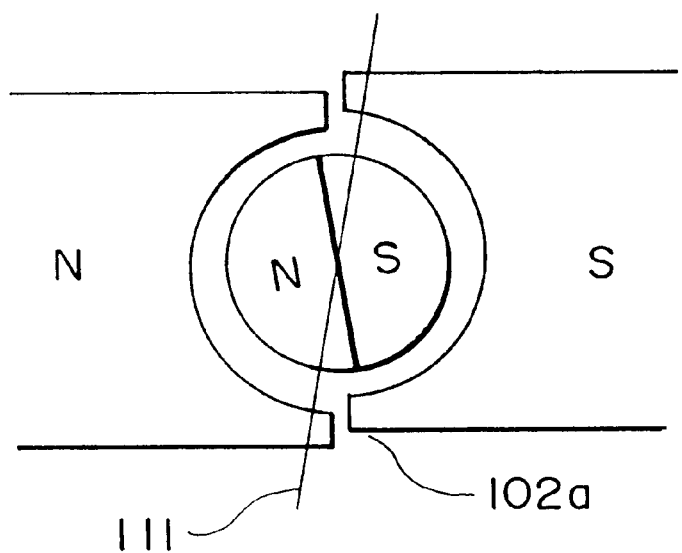
FIG. 7 is a plan view showing the rotation direction of the bipolar stepping motor in FIG. 1.
Figure 8:
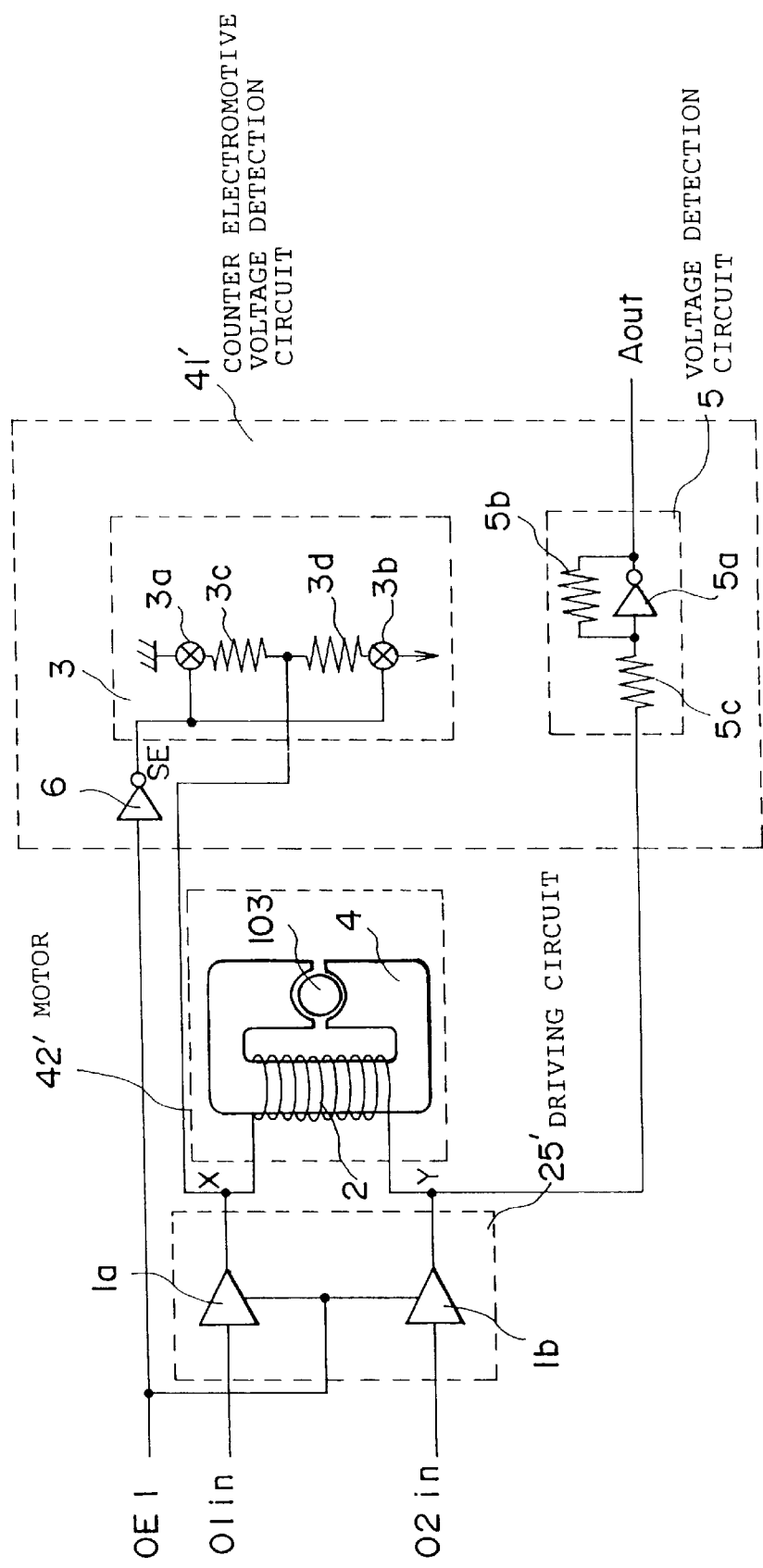
FIG. 8 is a circuit diagram of a driving circuit in a motor driving apparatus of a prior art.

In rotating the rotor 103 shown in FIG. 8, when the starting signal SS is externally input to the pulse control circuit 27, the pulse control circuit 27 outputs the signal Ptrg to change the signal OE1 to "H" at a period tb, as shown in FIG. 19. The signal OE1 is output to the signal O1in when the output signal Q from the flip-flop circuit 46 is at "L" level, or to the signal O2in when the output signal Q is at "H" level. In FIG. 19, since the output signal Q immediately after the signal SS is output is at "L", the signal OE1 is output to the signal O1in. In FIG. 19, since the signal Q is at "L" during a period t2 after the period tb when the signal OE1 is output, and the signal OE1 is at "L", the positive-edge detection circuit 26a becomes active.

During a period t1 in FIG. 19, while the signal OE1 is at "H", the driving pulse signal for the signal O1in is output. While the signal OE1 is at "L", outputs from the motor drivers 1a and 1b are set to a high-impedance state, and a bias means 3 is operated to detect the counter electromotive voltage from the motor.

The waveform of the signal Aout during the period t1 in FIG. 19 will be explained with reference to the enlarged chart of FIG. 20.

When the driving pulse signal having the waveform of the signal O1in is output, the waveform of Aout during the period t1 is the synthesized waveform of the induced voltage Vr generated at a driving coil 2 and the counter electromotive voltage Vg generated upon rotation of the motor. During the period t2 in FIG. 20, the induced voltage Vr is dominant immediately after the signal O1in changes to "L". As the influence of the induced voltage Vr disappears with the lapse of time, the counter electromotive voltage Vg is observed. During the period t2 when the potential level of the counter electromotive voltage Vg is higher than Vb, i.e., when the rotor 103 has not completely rotated through 180°, the waveform of the signal Aout inevitably crosses the potential Vb from the negative in the positive direction before the influence of the induced voltage Vr disappears (at time P1 in FIG. 20).

When the signal OE1 changes to "L", the timer circuit B 32 starts a timer operation. Since the output signal Q from the flip-flop circuit 46 is at "L", the positive-edge detection circuit 26a becomes operative while the signal OE1 is at "L". When it is observed that the waveform of the signal Aout crosses Vb from the negative direction to the positive direction at the time P1 during the period t2 in FIG. 20, the positive-edge detection circuit 26a outputs the positive-edge detection signal PE. Upon reception of the signal PE through the OR circuit 31, the timer circuit B 32 stops its timer operation. When no signal is output from the timer circuit B 32 during a predetermined time (t2), the pulse control circuit 27 outputs the signal Ptrg after the predetermined time. Upon reception of the signal Ptrg, the waveform shaping circuit 23 outputs an "H" signal OE1 during a period tc. During the subsequent period t3, the counter electromotive voltage is detected in the same manner as during the period t2.

Since the waveform of the signal Aout crosses the potential Vb from the negative in the positive direction at times P1, P2, and P3 during the periods t2, t3, and t4 in FIG. 20, Ptrg is output, and an "H" signal is output to the signal OE1. During a period when the potential level of the counter electromotive voltage Vg is lower than Vb, i.e., during a period t5 in FIG. 20, the rotor 103 has rotated through 180° or more, so the waveform of the signal Aout does not cross the potential Vb from the negative direction to the positive direction. Therefore, during the period t5, the positive-edge detection circuit 26a does not output the positive-edge detection signal PE. If the timer circuit B 32 does not receive any positive-edge detection signal PE during the period t5, and the predetermined time (t5) elapses, the timer circuit B 32 outputs Tup'. Upon reception of the signal Tup', the pulse control circuit 27 outputs the signal Ptrg. As a result, the waveform shaping circuit 23 outputs the signal OE1. At this time, since the signal Q from the flip-flop circuit 46 changes from "L" to "H" in response to the signal Tup', the driving control circuit 24 outputs the driving pulse signal to the signal O2in side. The subsequent operation is the same as in the above-mentioned first embodiment.

According to the second embodiment, by setting the interval for detecting the counter electromotive voltage during output of the driving pulse signal, the driving coil can be used as a counter electromotive voltage detection coil to simplify the arrangement. According to this embodiment, since the interval between the driving pulse signal and the next driving pulse signal can be eliminated, the motor can be stably driven at a high speed.

Figure 21:
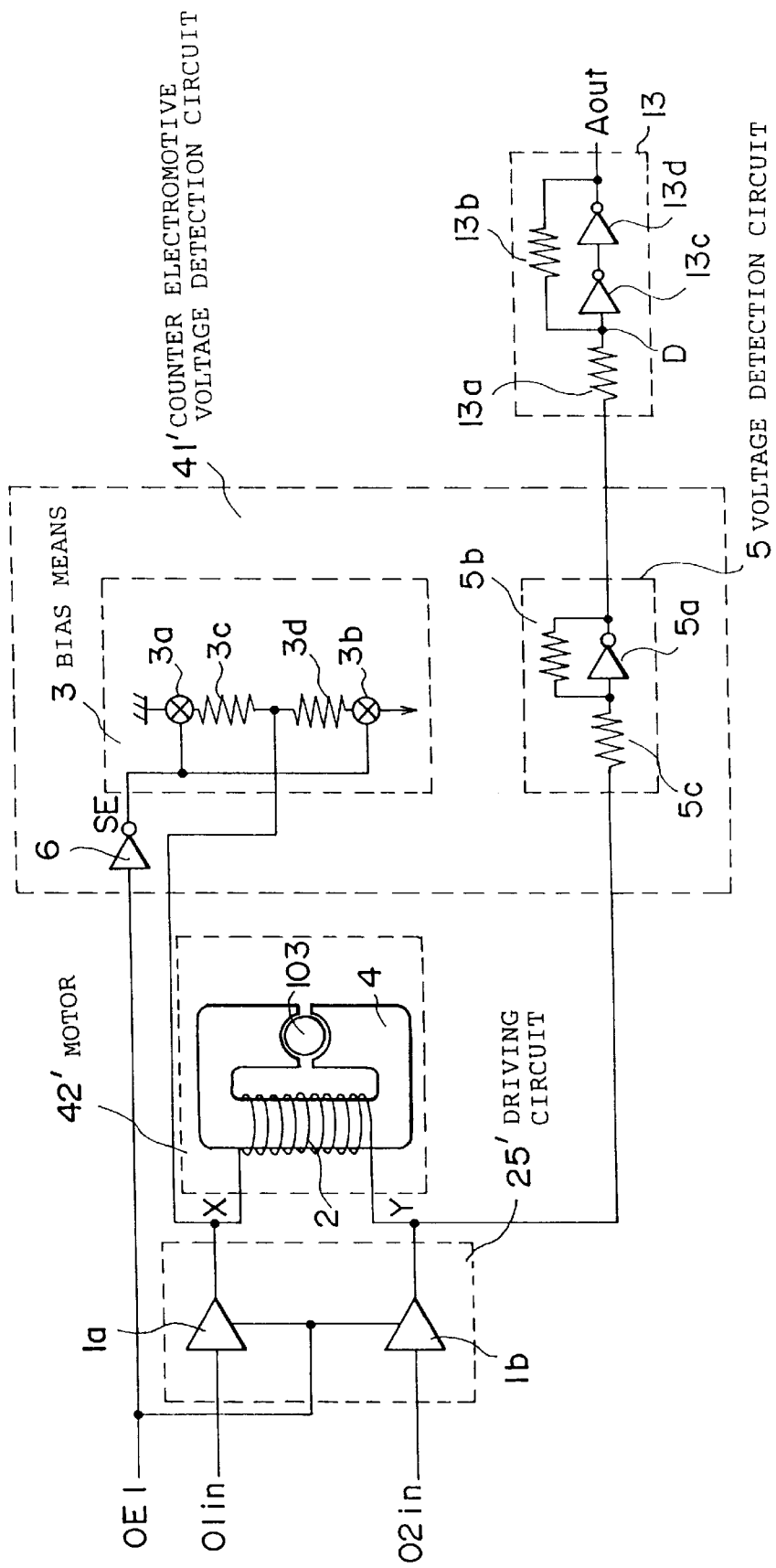
FIG. 21 is a circuit diagram when a hysteresis comparator is applied to the driving circuit in FIG. 8.

A driving circuit in FIG. 21 is obtained by adding a hysteresis comparator 13 to the driving circuit in FIG. 8. The hysteresis comparator 13 is connected to the output of the voltage detection circuit 5. The hysteresis comparator 13 is constituted by an input resistor 13a, a feedback resistor 13b, and inverters 13c and 13d. In this arrangement, a hysteresis may be given to the reference potential for checking crossing of the counter electromotive voltage in order to detect the pole position.

If the hysteresis comparator is arranged in this manner to delay the timing for detecting whether the counter electromotive voltage crosses the reference potential, a malfunction caused by the influence of an external magnetic field or the like can be prevented. Further, even when a physical shock or the like is applied to the motor, the motor can rotate very stably.

The method of controlling output of the pulse immediately after the motor starts has been described above. A method of outputting a pulse while the rotation speed of the motor after it starts shifts from an acceleration state to a constant-speed state will be described as the third embodiment.

This embodiment to be described is associated with a means particularly effective for a motor having a load with a large inertia, such as a flat weight for a date face or a vibration alarm.

Figure 22:
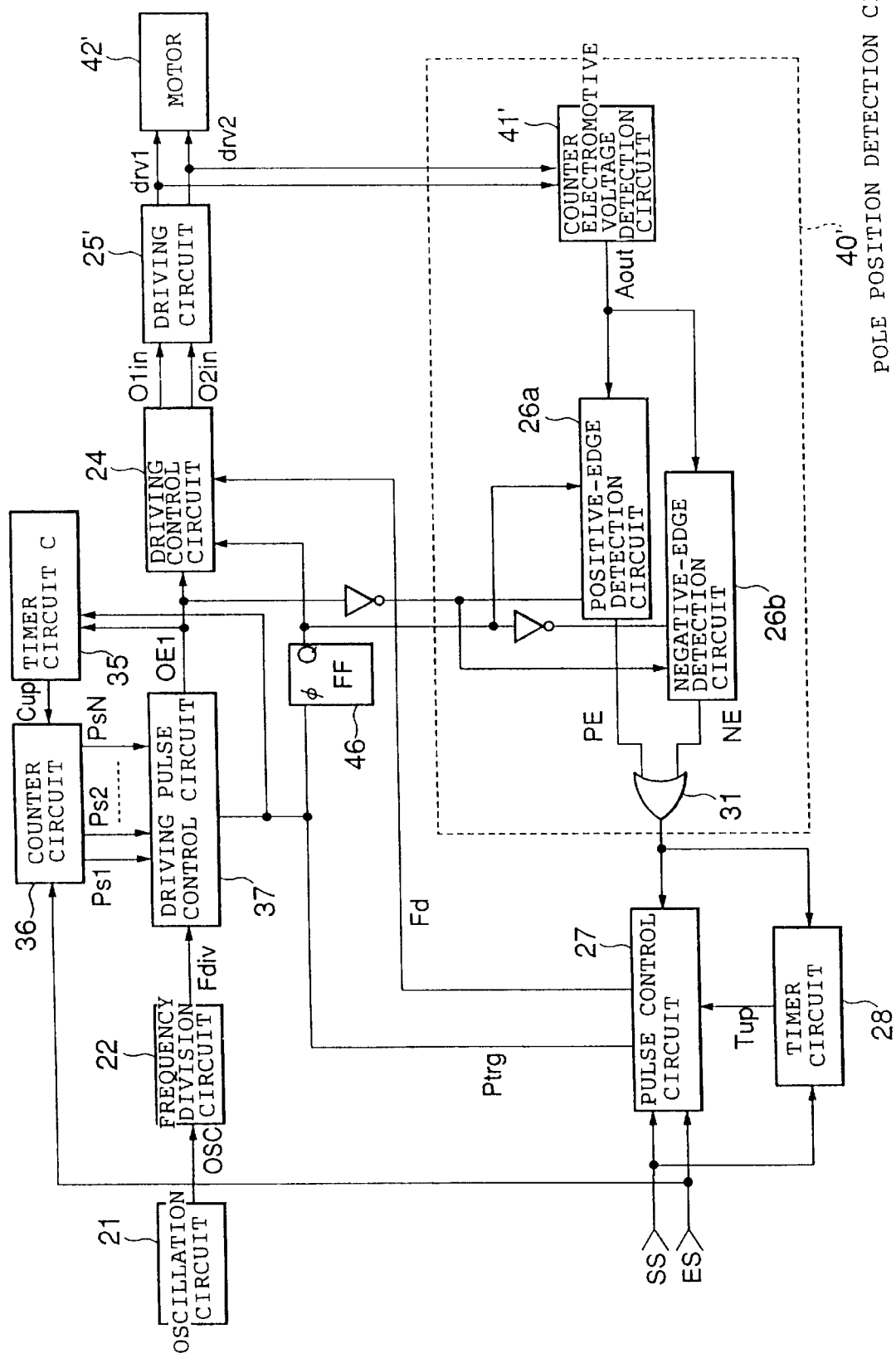
Fig 22 is a block diagram showing the third embodiment of the driving system in the motor driving apparatus of the present invention.
Figure 23:
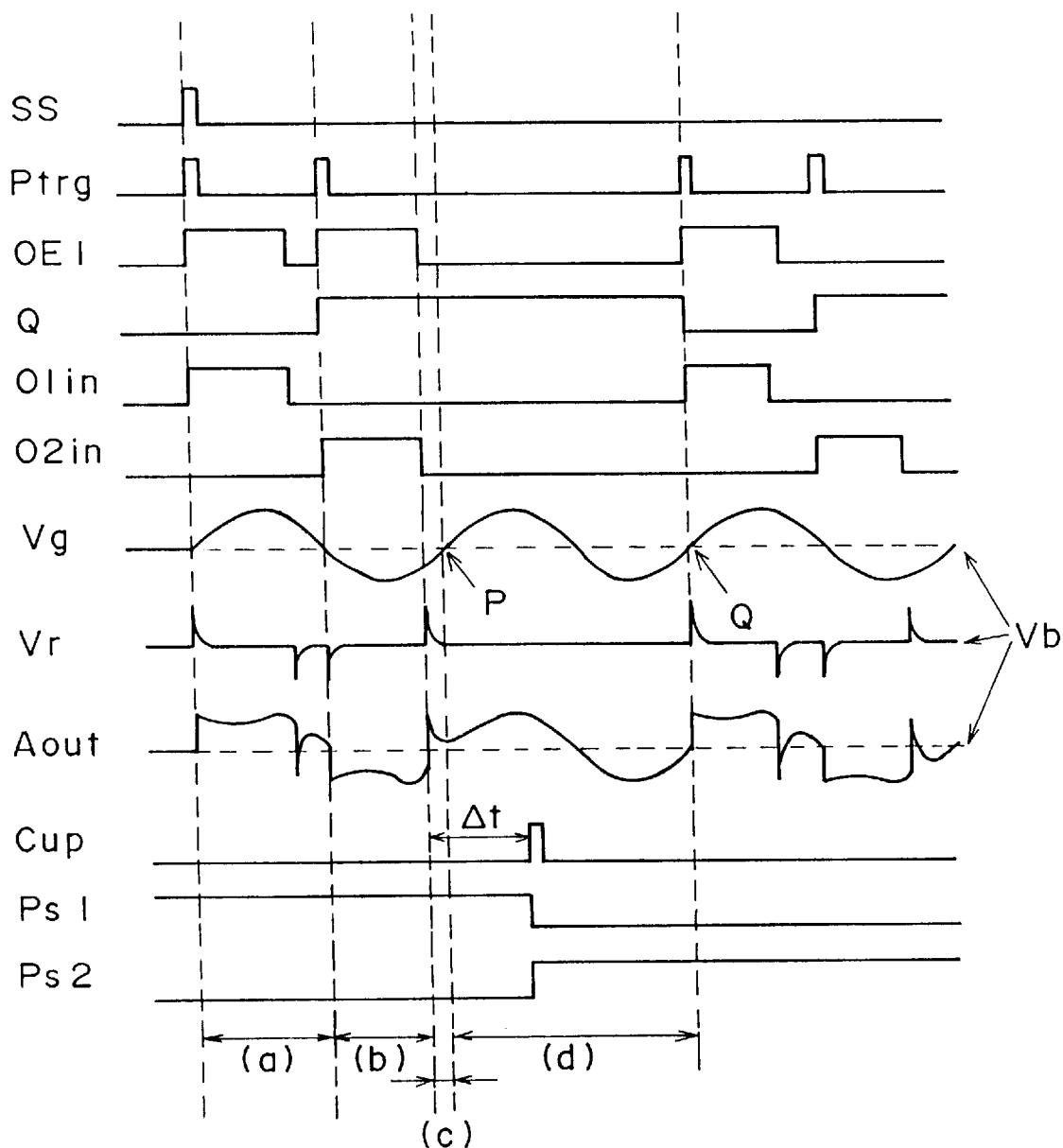
FIG. 23 is a waveform chart showing the operation of the driving system in FIG. 22.

FIG. 22 is a block diagram showing the arrangement of the third embodiment. A description of parts common to the first and second embodiments will be omitted. FIG. 23 is a waveform chart showing the operation in FIG. 22.

In FIG. 22, reference numeral 35 denotes a timer circuit C for starting a timer operation in synchronism with the fall of the signal OE1. When the signal OE1 is at "L", the timer circuit C 35 starts operation, outputs a signal Cup after a predetermined time, and is reset by the signal Ptrg. Reference numeral 36 denotes a counter circuit for counting signals Cup from the timer circuit C 35, and switching and outputting pulse width selection signals Ps1 to PsN. Reference numeral 37 denotes a driving pulse control circuit for changing the width of the signal OE1 on the basis of the pulse width selection signals Ps1 to PsN. A driving circuit 25', a counter electromotive voltage detection circuit 41', and a motor 42' in FIG. 22 have the same arrangements as those in FIG. 8 described in the prior art. A description of the same arrangement as that in the above-described second embodiment will be omitted.

In the initial state, the count value of the counter circuit 36 is cleared, and therefore the signal Ps1 is at "H". The driving pulse control circuit 37 changes the pulse width of a driving pulse signal to be output in accordance with the signals Ps1 to PsN output from the counter circuit 36. In this case, the signal Ps1 is at "H", i.e., a driving pulse signal having the largest width is output immediately after the start.

As the "H"-level signal changes in the order of the signals Ps2, Ps3, . . . , PsN (to be described later), the pulse width of the driving pulse signal is decreased.

Figure 9:
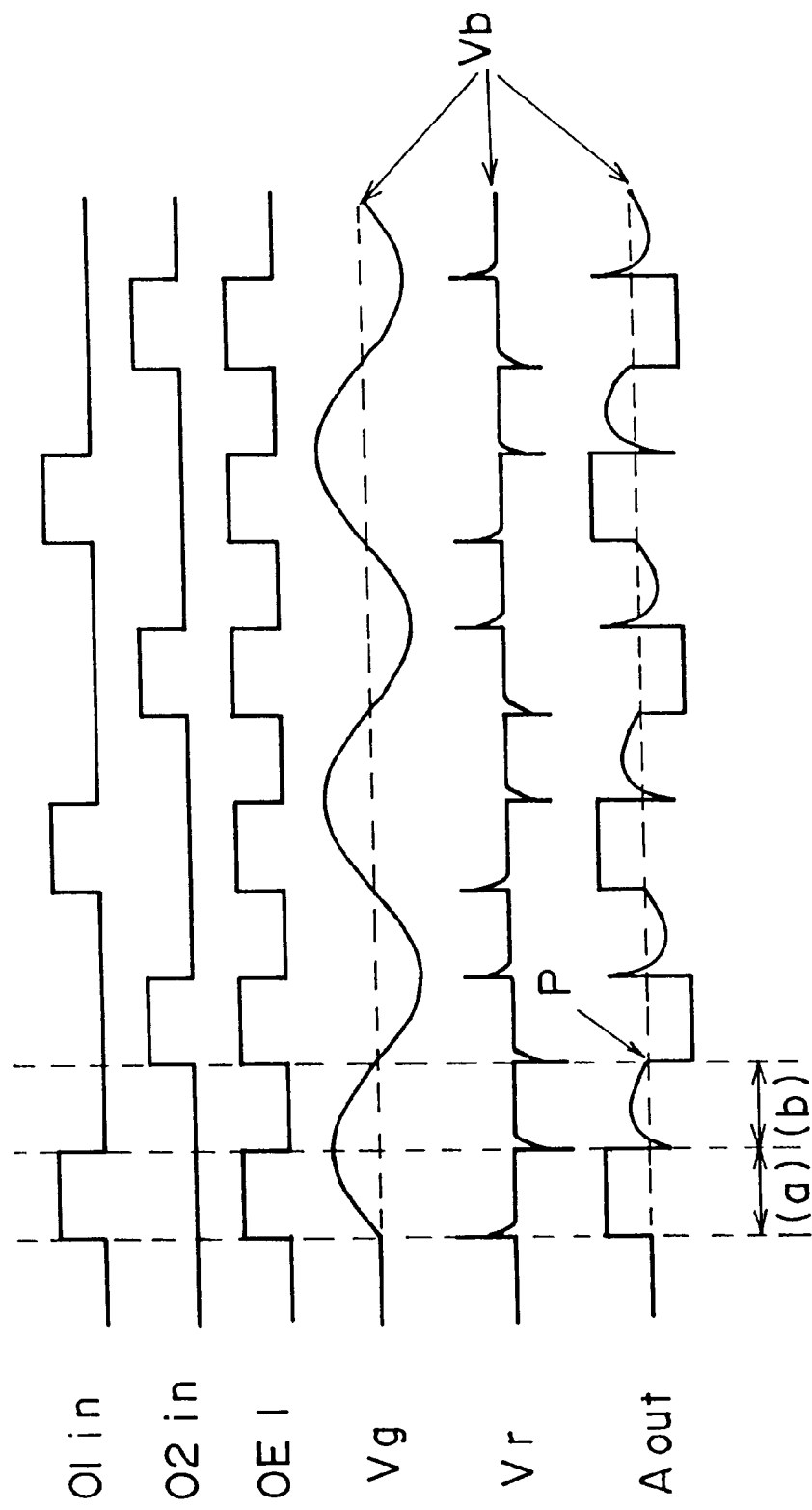
FIG. 9 is a waveform chart showing the operation of the driving circuit in FIG. 8.

The state wherein the motor starts upon reception of the signal SS, i.e., a period (a) in FIG. 23 is the same as in FIG. 9 described above, and a description thereof will be omitted.

In FIG. 23, when the rotation speed of the motor is increased by the first and second pulses, the pulse width of the driving pulse signal becomes excessive, as described above. Crossing of the level Vb from the negative direction to the positive direction, which is supposed to occur at the time P in FIG. 23, does not occur, so no next driving pulse signal is output.

When the signal OE1 changes to "L", the timer circuit C 35 starts a timer operation in the normal state, i.e., in the state such as the period (a) in FIG. 23. The timer circuit C 35 outputs no signal because it is reset by the next signal Ptrg before the lapse of a predetermined timer operation end time Δt set in advance. However, when the signal Aout does not cross Vb, and no signal Ptrg is output the time Δt after the signal OE1 falls, as during periods (c) and (d) in FIG. 23, it is determined that the rotor 103 has already reached a position where the motor is driven by the next driving pulse signal, and the timer circuit C 35 outputs an "H"-level pulse signal to the signal Cup. Upon reception of the signal Cup, the counter circuit 36 counts up an internal counter, and sets the signal Ps1 to "L" and the signal Ps2 to "H". As a result, the signal OE1 is output as a driving pulse signal having a smaller pulse width.

When the rotation speed of the motor reaches a certain degree or more, or when a load having a large inertia is connected to the motor, as described above, even if no driving pulse signal is output at the time P in FIG. 23, rotation does not immediately stop though the rotation speed slightly decreases. Therefore, if the next driving pulse signal is output at time Q, rotation itself does not stop. However, when the pulse width of the driving pulse output at the time Q is equal to that of the previous driving pulse signal, the rotation speed, which has decreased once due to the absence of the driving pulse signal at the time P, undesirably increases again to cause the situation as shown at the time P in FIG. 23 again. A further increase in rotation speed cannot be expected.

In this embodiment, when the waveform of the signal Aout does not cross the bias voltage Vb within a predetermined time upon outputting the driving pulse signal, the pulse width of a driving pulse signal to be output next is decreased. If the rotation speed of the motor increases in this state, the same state as that at the time P in FIG. 23 also occurs. At this time, the above-described control is performed to decrease the pulse width of the driving pulse signal. By repeatedly performing the same control for the pulse width of the driving pulse signal, the rotation speed gradually increases, and is stabilized at the maximum rotation speed. In this state, the driving pulse signal does not have an excessive width. Therefore, since the crossing point of the waveform of the signal Aout over the bias voltage Vb can be detected, the driving pulse can be reliably output to attain stable rotation.

The motor is stopped by the signal ES, as described above. Upon reception of the signal ES, the counter circuit 36 is reset to set the counter value to an initial state. Since the signal Ps1 is at "H" in next driving of the motor, a driving pulse signal having the largest width is output.

As described above, by employing the third embodiment, a driving pulse signal having an optimal width is selected in accordance with the rotation speed of the motor. The motor can be rapidly accelerated and stably rotated, and the rotation speed can be increased. In the description of this embodiment, the driving circuit 25', the counter electromotive voltage detection circuit 41', and the motor 42' have the circuit configuration described in FIG. 8. Even with the circuit configuration in FIG. 10, the same operation can be obtained.

Figure 24:
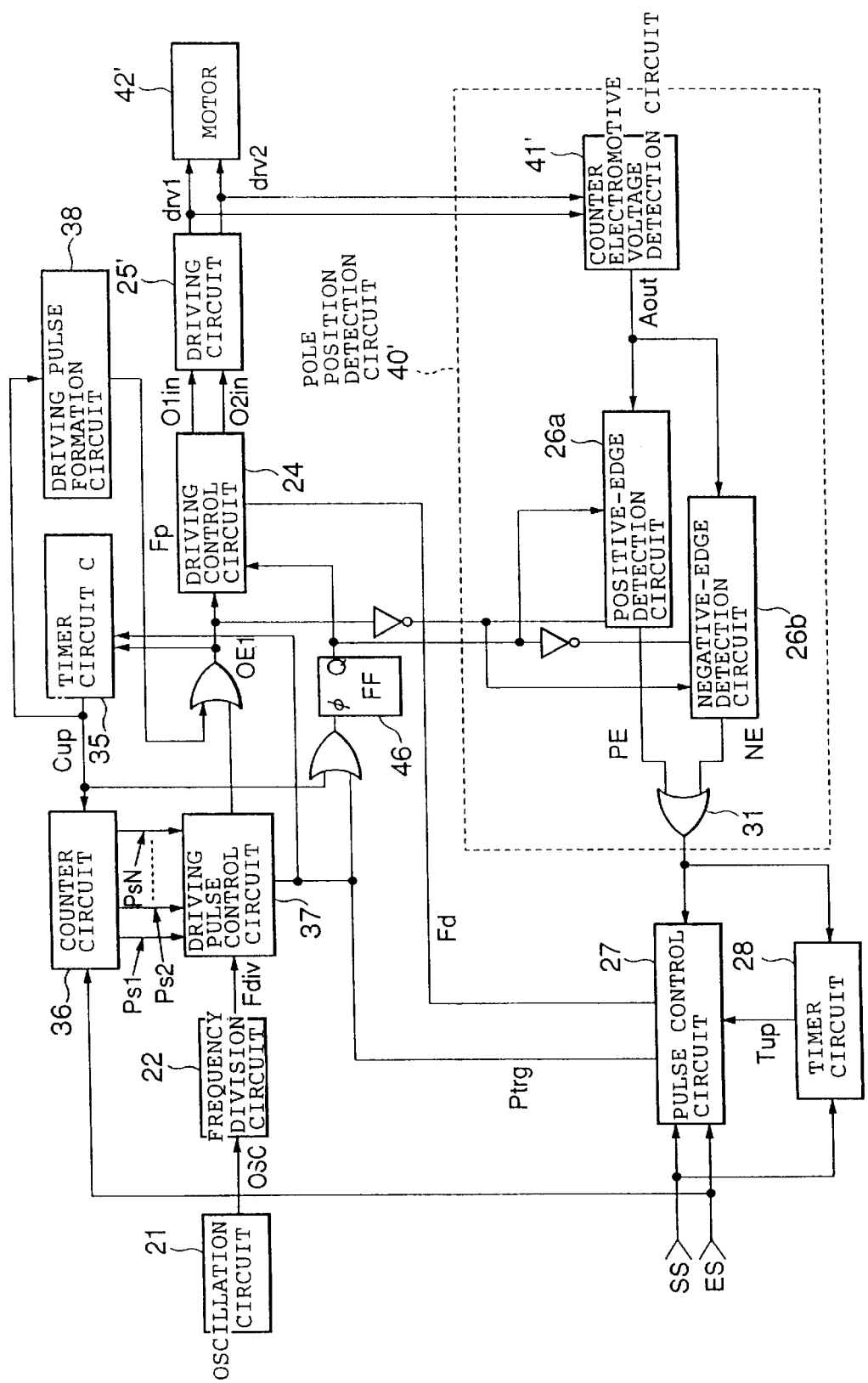
FIG. 24 is a block diagram showing another arrangement of the third embodiment shown in FIG. 22.
Figure 25:
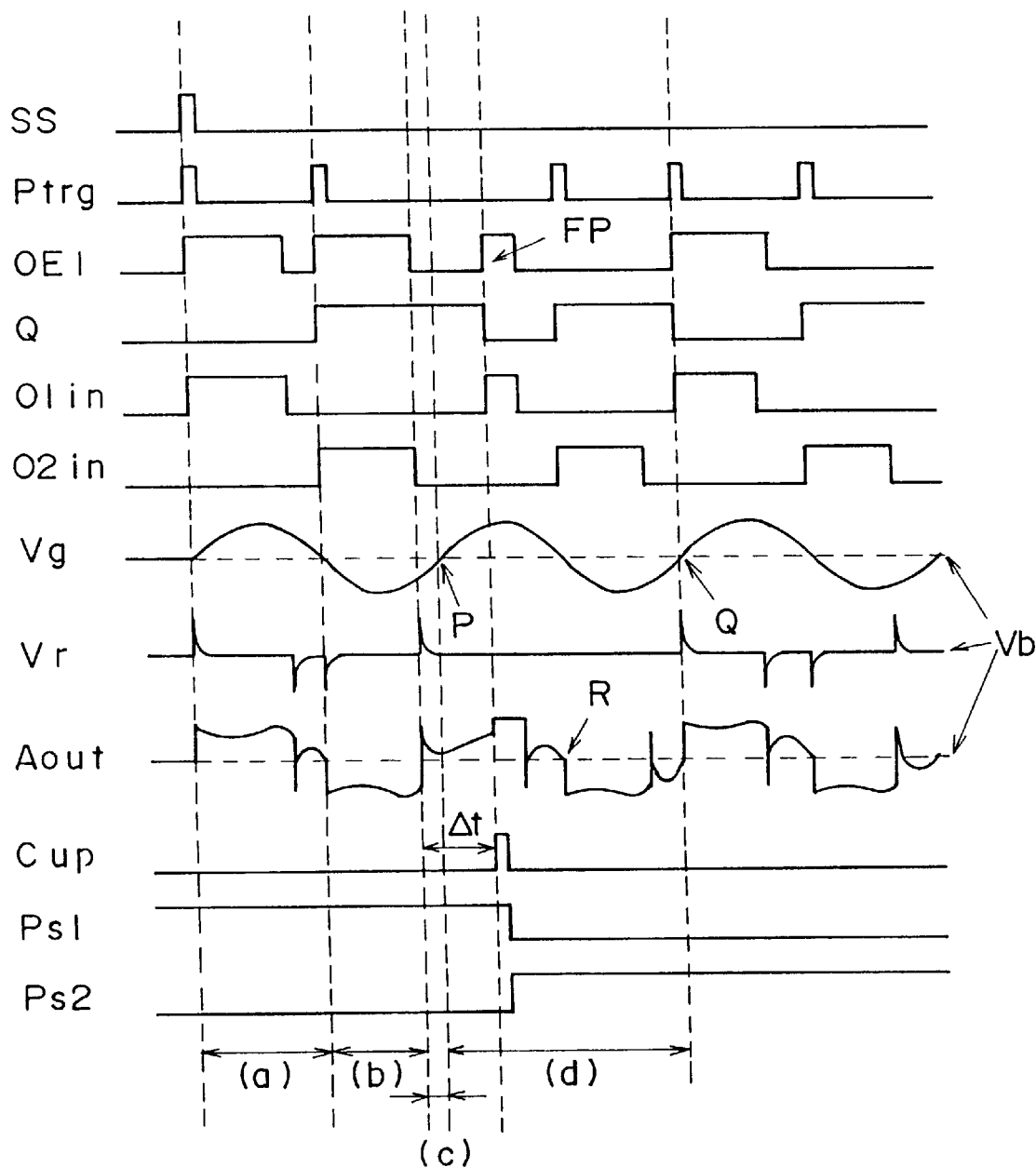
FIG. 25 is a waveform chart showing the operation of the driving system in FIG. 24.

Note that the third embodiment may employ an arrangement like the one shown in FIG. 24. FIG. 24 is a block diagram showing another arrangement of the third embodiment. A description of the same arrangement as that shown in FIG. 22 will be omitted. FIG. 25 is a waveform chart showing the operation in FIG. 24.

In the block diagram of FIG. 24, a compensation pulse formation circuit 38 is newly arranged. When no signal Ptrg is output the time Δt after the signal OE1 falls, as during a period (d) in FIG. 25, the timer circuit C 35 outputs an "H"-level pulse signal to the signal Cup. Upon reception of the signal Cup, the compensation pulse formation circuit 38 outputs a compensation pulse signal FP. This signal FP is input as the signal OE1 to a driving control circuit 24 through an OR circuit. The output signal Q from the flip-flop circuit 46 is switched from "H" to "L" by the signal Cup. As a result, the compensation pulse signal FP is output as the driving pulse signal for the signal O1in.

With this arrangement, even if no signal Ptrg is output, the compensation pulse signal FP can be output to suppress a temporary decrease in speed.

The compensation pulse signal FP to be output desirably has a pulse width smaller than that of a normal driving pulse signal. When the width of the signal FP is larger, the crossing timing of the signal Aout over the potential Vb from the positive in the negative direction may be lost. This can be prevented by setting the pulse width of the compensation pulse signal FP smaller.

Figure 26:
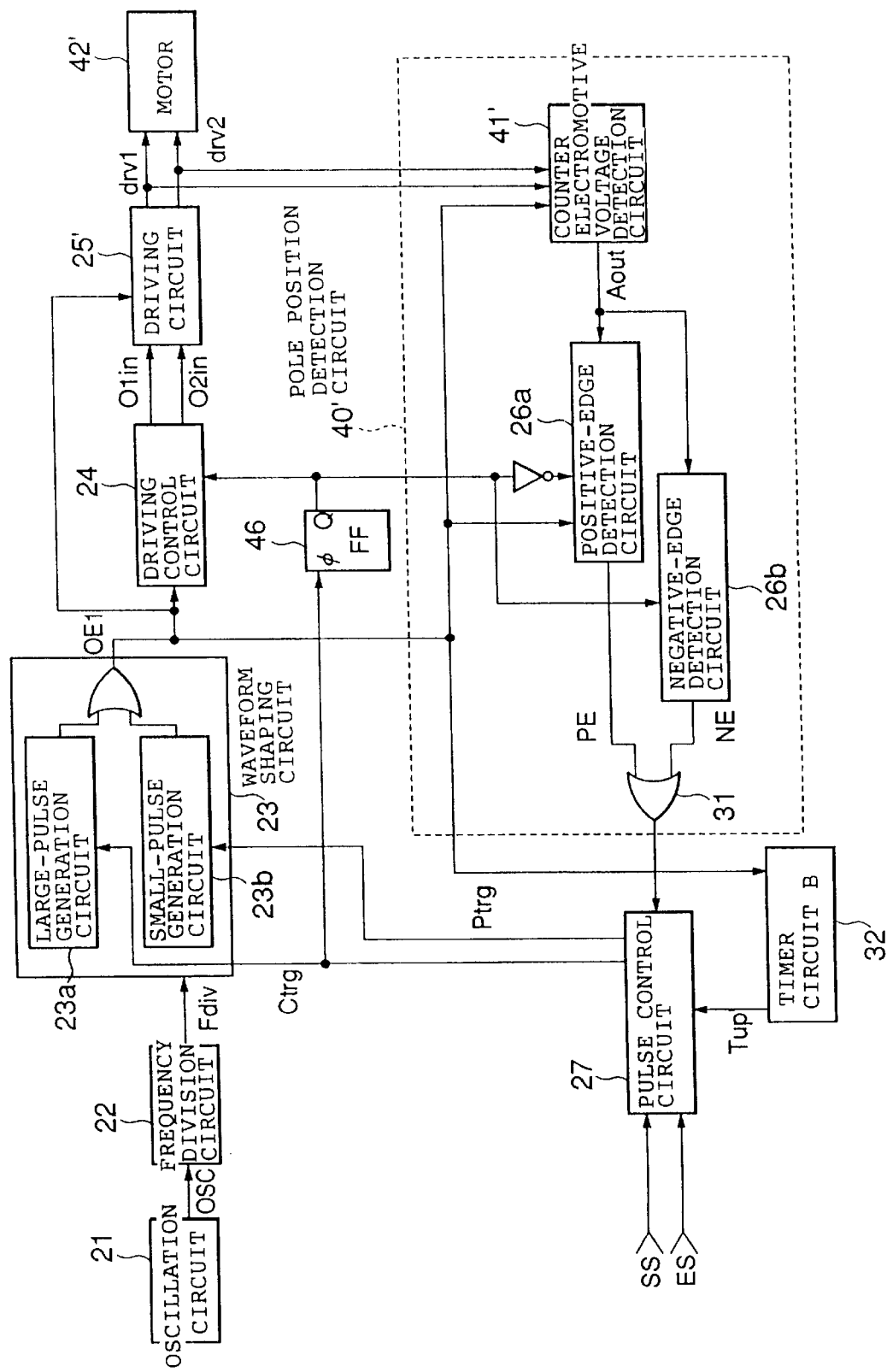
FIG. 26 is a block diagram showing the fourth embodiment of the driving system in the motor driving apparatus of the present invention.
Figure 27:
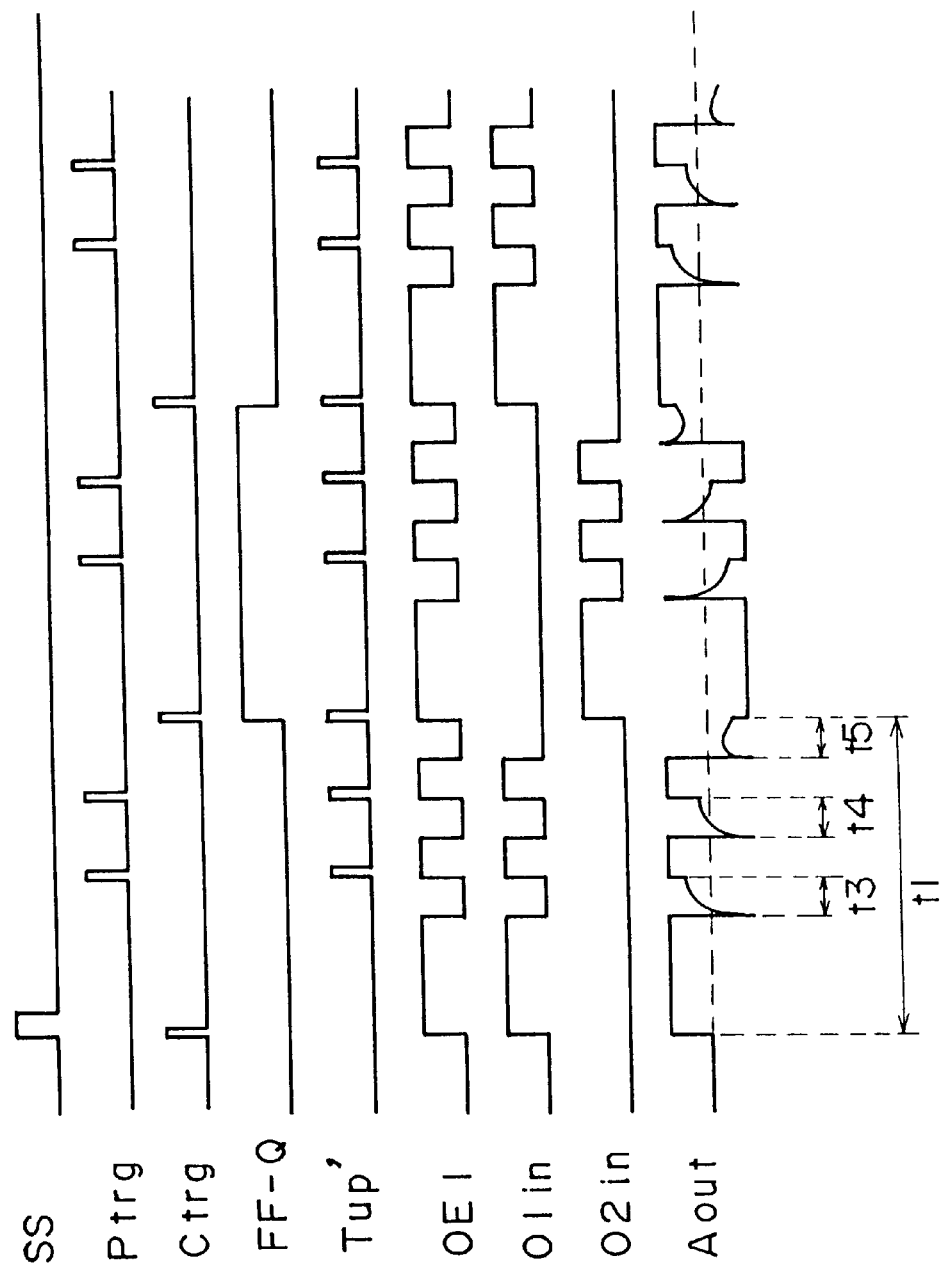
FIG. 27 is a waveform chart showing the operation of the driving system in FIG. 26.
Figure 28:
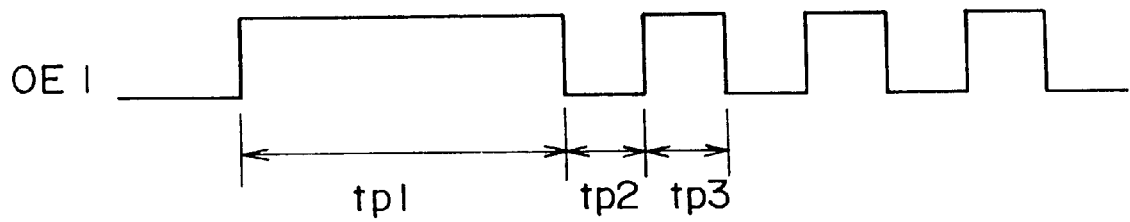
FIG. 28 is a waveform chart showing the operation of the driving system in FIG. 26.

The fourth embodiment of the present invention will be described below. FIG. 26 is a block diagram showing the arrangement of the fourth embodiment. A description of parts common to the second embodiment will be omitted. FIG. 27 is a waveform chart showing the operation in FIG. 26, and FIG. 28 is an enlarged waveform chart for the signal OE1.

This embodiment is a modification of the second embodiment described above. Referring to the waveform chart of the second embodiment in FIG. 19, in the second embodiment, a plurality of driving pulse signals having the same pulse width are output within the period t1 to enable detection of the counter electromotive voltage within the period t1. With this setting, however, the driving pulse signal output time becomes short due to the counter electromotive voltage detection time, and the time for supplying a rotation energy to the motor (driving pulse signal output time) is sacrificed, as is apparent from FIG. 19. For this reason, to rapidly accelerate and stably rotate the motor, this embodiment, i.e, the fourth embodiment is effective.

In this embodiment, of a period t1 in FIG. 27, during the initial period when it is apparent that a rotor 103 has not completely rotated through 180°, detection of the counter-electromotive voltage is not performed, and a driving pulse signal having a relatively large pulse width is output to prolong the time for supplying the rotation energy to the motor (driving pulse signal output time). This embodiment will be described in detail below.

In this embodiment, a waveform shaping circuit 23 is constituted by a large-pulse generation circuit 23a and a small-pulse generation circuit 23b, as shown in FIG. 26. A timer circuit B 32 is reset and restarted in response to the fall of the signal OE1, and outputs the signal Tup' after a predetermined time. Upon reception of the signal Tup', a pulse control circuit 27 outputs a signal Ctrg or Ptrg. The pulse control circuit 27 outputs the signal Ctrg when it does not receive any signal PE or NE from a pole position detection circuit 40' during the interval between input of the previous signal Tup' and input of the latest signal Tup', or outputs the signal Ptrg when it receives the signal PE or NE. The waveform shaping circuit 23 outputs a signal OE1 having a relatively large pulse width when it receives the signal Ctrg, or outputs a signal OE1 having a relatively small pulse width when it receives the signal Ptrg. The signal Ctrg is also input to a flip-flop circuit 46 to switch the signals O1in and O2in. When the pulse control circuit 27 receives the signal SS, it outputs the signal Ctrg unconditionally. The timer circuit B 32 is reset in response to the fall of the signal OE1.

With the arrangement in FIG. 26, control as shown in FIG. 27 can be performed. Referring to the period t1 in FIG. 27, a driving pulse signal having a relatively large pulse width is first output once, and then a driving pulse signal having a relatively small pulse width is output. Referring to FIG. 28, a signal having a relatively large pulse width is output as the signal OE1 during a period tp1, and a signal having a relatively small pulse width is output during a period tp3 after a period tp2.

As described above, in this embodiment, of the period t1 in FIG. 27, during the period when it is apparent that the rotor 103 has not completely rotated through 180°, detection of the counter electromotive voltage is not performed, and a driving pulse signal having a relatively large pulse width is output to prolong the time for supplying the rotation energy to the motor (driving pulse signal output time). The motor can be rapidly accelerated and stably rotated.

Figure 29:
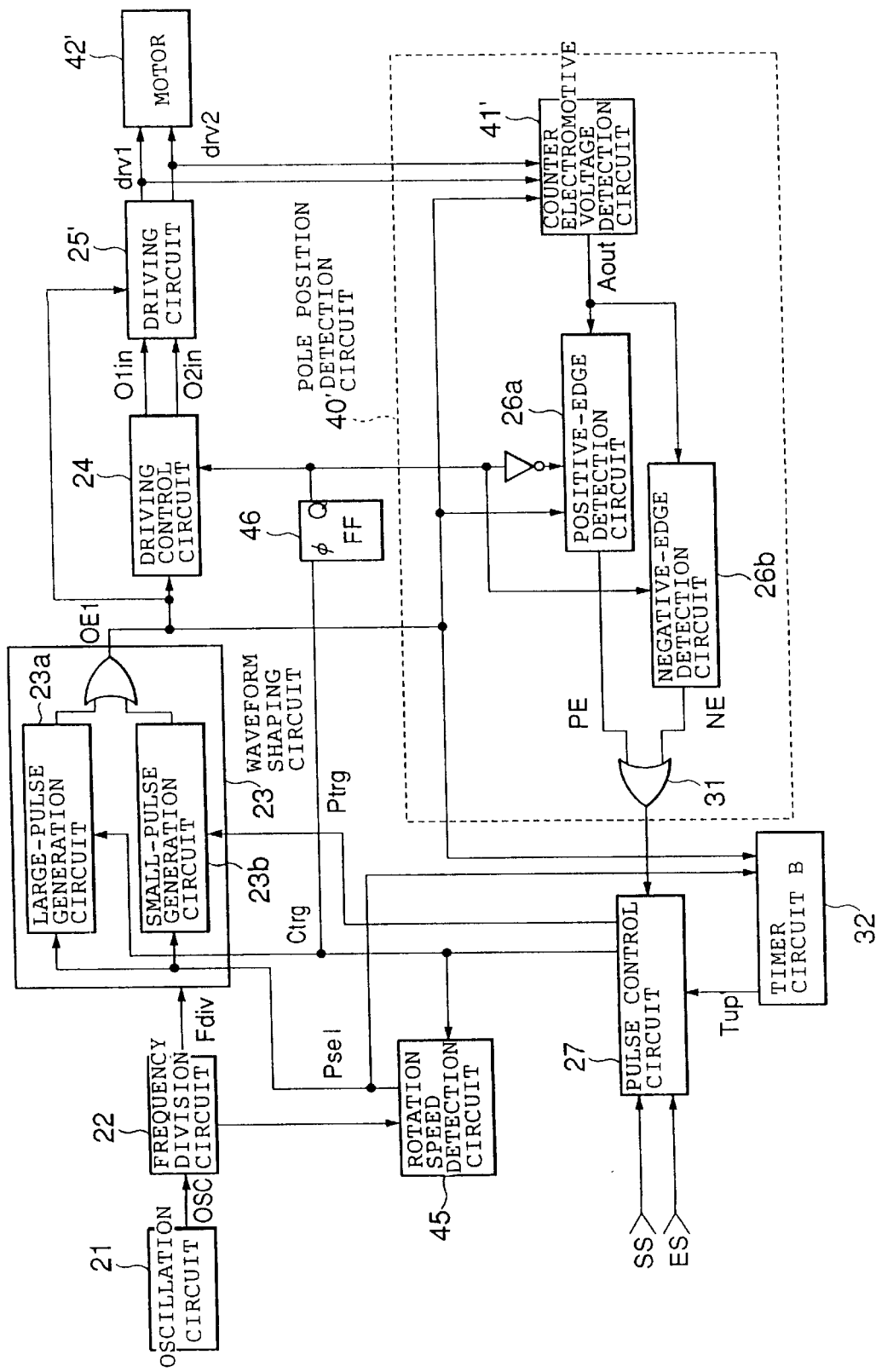
FIG. 29 is a block diagram showing the fifth embodiment of the driving system in the motor driving apparatus of the present invention.
Figure 30:
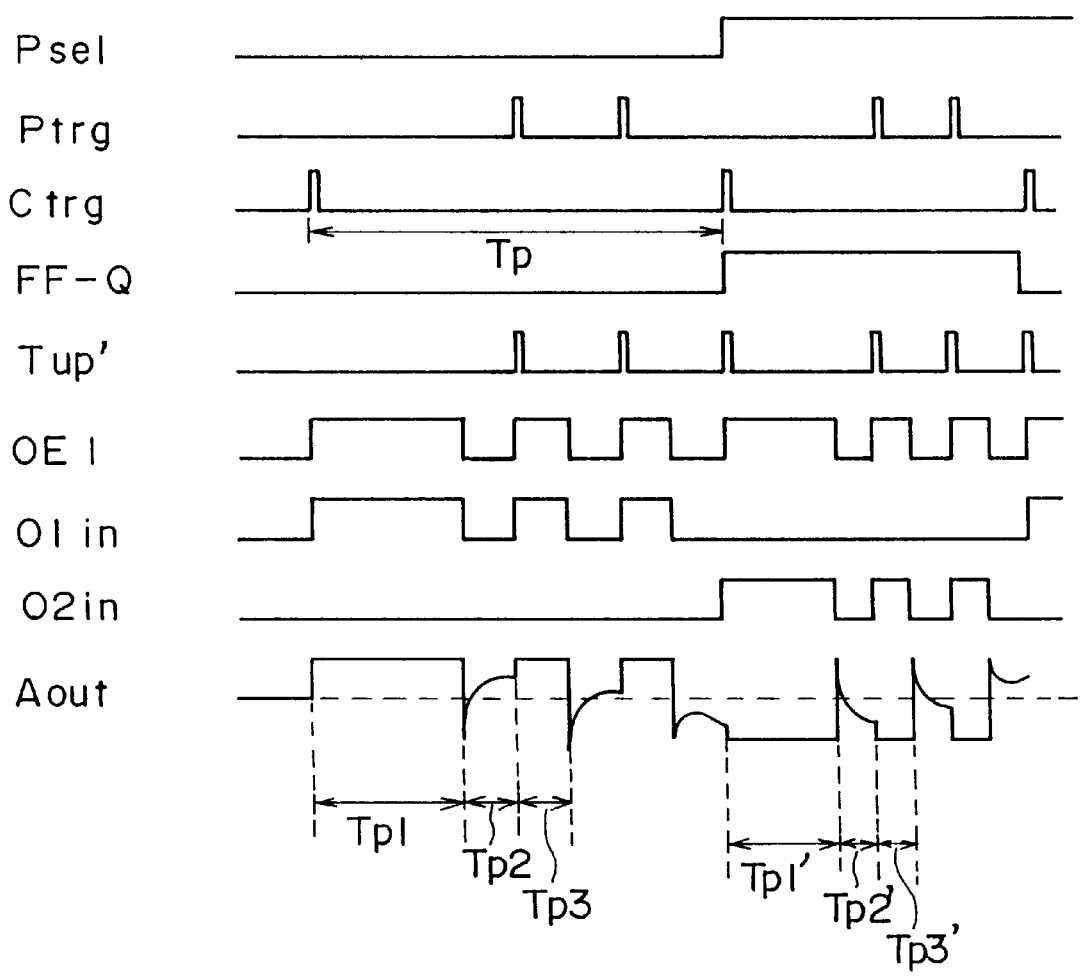
FIG. 30 is a waveform chart showing the operation of the driving system in FIG. 29.

The fifth embodiment of the present invention will be described below. FIG. 29 is a block diagram showing the arrangement of the fifth embodiment. A description of parts common to the fourth embodiment will be omitted. FIG. 30 is a waveform chart showing the operation in FIG. 29.

This embodiment is a modification of the fourth embodiment. In the fourth embodiment, the pulse width of a signal generated by the large-pulse generation circuit 23a, that of a signal generated by the small-pulse generation circuit 23b, and the times (e.g., t3, t4, and t5) measured by the timer circuit B 32 are always constant. However, since the length of the period t1 shown in FIG. 27 changes in accordance with the rotation speed of the motor, the motor can be more rapidly accelerated and stably rotated by changing these values in accordance with the rotation speed of the motor.

In this embodiment, the pulse width of a signal generated by a large-pulse generation circuit 23a, that of a signal generated by a small-pulse generation circuit 23b, and the time measured by a timer circuit B 32 can be changed in accordance with the rotation speed of the motor.

In this embodiment, a rotation speed detection circuit 45 is newly arranged as shown in FIG. 29. The rotation speed detection circuit 45 calculates the generation interval of the signal Ctrg from a pulse control circuit 27 by using a signal from a frequency division circuit 22 as a reference clock, and obtains the rotation speed of the motor on the basis of the generation interval of the signal Ctrg. When the rotation speed of the motor becomes equal to or higher than a predetermined speed, the rotation speed detection circuit 45 switches a signal Psel from "L" to "H". The signal Psel is input to the large-pulse generation circuit 23a, the small-pulse generation circuit 23b, and the timer circuit B 32.

When the signal Psel is switched from "L" to "H", the large-pulse generation circuit 23a starts outputting a signal having a pulse width smaller than that of a previously generated signal. When the signal Psel is switched from "L" to "H", the small-pulse generation circuit 23b starts outputting a signal having a pulse width smaller than that of a previously generated signal. When the signal Psel is switched from "L" to "H", the timer circuit B 32 signal switches the time (counter electromotive voltage detection time) having been measured to a shorter time.

Referring to FIG. 30, when a generation interval Tp of the signal Ctrg becomes equal to or smaller than a predetermined value, the signal Psel is switched from "L" to "H". When the signal Psel becomes "H", a period Tp1 is switched to a shorter period Tp1', a period Tp2 is switched to a shorter period Tp2', and a period Tp3 is switched to a shorter period Tp3'.

When the rotation speed of the motor increases, the pulse width of a signal generated by the large-pulse generation circuit 23a, and that of a signal generated by the small-pulse generation circuit 23b are set smaller. With this setting, the number of output driving pulse signals having the same phase after 180°-rotation of the rotor 103 can be decreased to more rapidly accelerate and stably rotate the motor.

When the rotation speed of the motor increases, the time (counter electromotive voltage detection time) to be measured by the timer circuit B 32 is shortened. With this setting, the ratio of the counter electromotive voltage detection time to the driving pulse signal output time can be set within a predetermined range to more rapidly accelerate and stably rotate the motor. When the rotation speed of the motor increases, the voltage level of the counter electromotive voltage rises, so that the counter electromotive voltage can be detected within a shorter period. Accordingly, the time (counter electromotive voltage detection time) to be measured by the timer circuit B 32 can be shortened.

Figure 31:
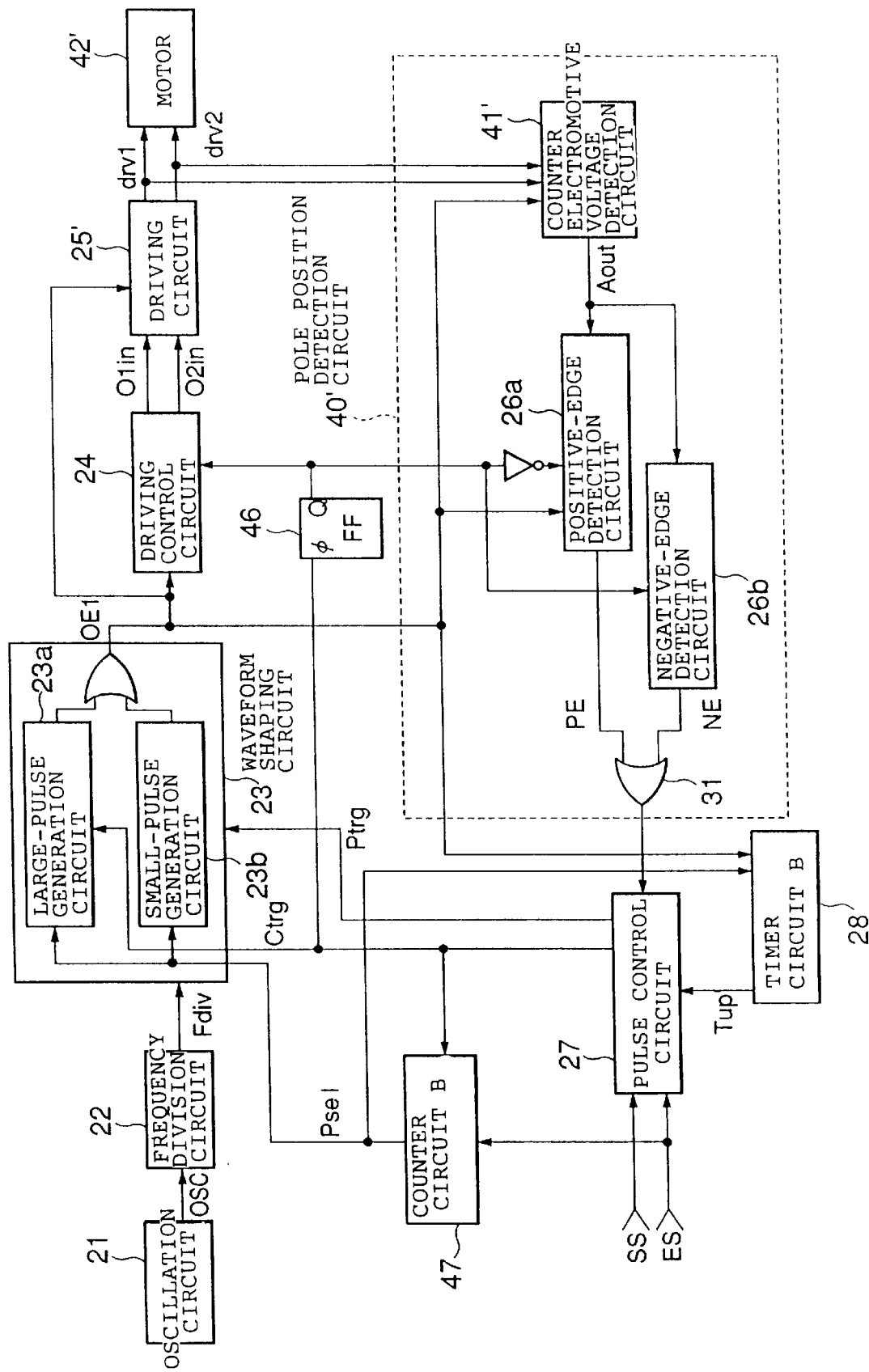
FIG. 31 is a block diagram showing the sixth embodiment of the driving system in the motor driving apparatus of the present invention.

The sixth embodiment of the present invention will be described below. FIG. 31 is a block diagram showing the arrangement of the sixth embodiment. A description of parts common to the fifth embodiment will be omitted.

This embodiment is a modification of the fifth embodiment. In the fifth embodiment, the rotation speed detection circuit 45 is arranged to change, e.g., the pulse width of a signal generated by the large-pulse generation circuit 23a or the like. In the sixth embodiment, a counter circuit B 47 is arranged to change, e.g., the pulse width of a signal generated by a large-pulse generation circuit 23a, or the like.

In this embodiment, the rotation speed of the motor is estimated by counting the number of signals Ctrg generated after the motor starts rotation. That is, the rotation speed of the motor is estimated based on the count value of the signals Ctrg because the rotation speed of the motor increases in accordance with the number of signals Ctrg generated after the motor starts. The counter circuit B 47 counts the number of signals Ctrg from a pulse control circuit 27, and when the count value reaches a predetermined value or more, switches the signal Psel from "L" to "H". This signal Psel is input to the large-pulse generation circuit 23a, a small-pulse generation circuit 23b, and a timer circuit B 32. When the stop signal ES is input to the counter circuit B 47, the count value of the counter circuit B 47 is reset. The remaining operation is the same as that in the fifth embodiment, and a description thereof will be omitted.

In the sixth embodiment, since the rotation speed of the motor is simply estimated based on the count value of the signals Ctrg, the same effect as that of the fifth embodiment can be obtained. Further, since a circuit for detecting the rotation speed of the motor can be omitted, the circuit can be simplified.

Figure 32:
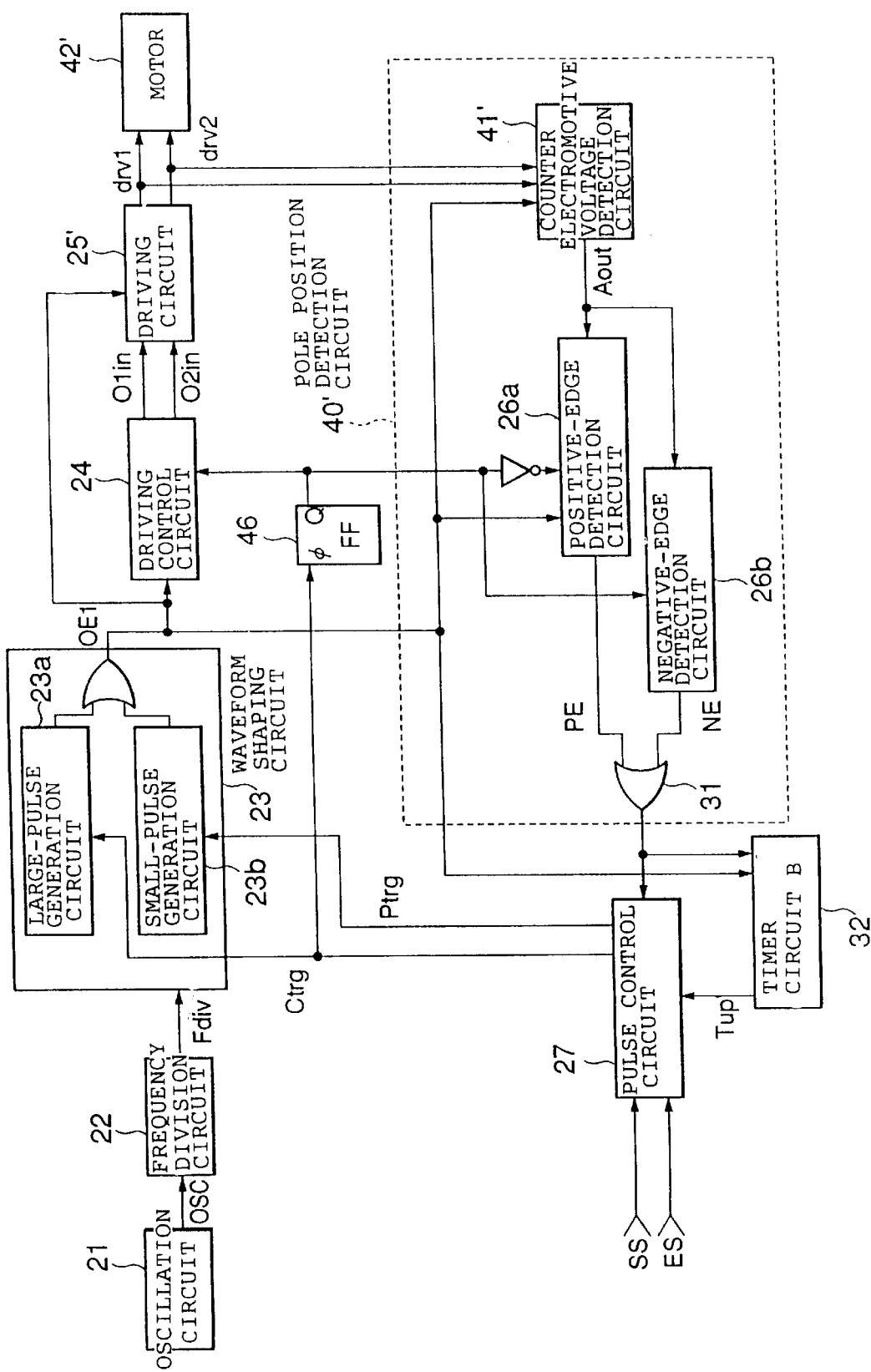
FIG. 32 is a block diagram showing the arrangement of the seventh embodiment of the driving system in the motor driving apparatus of the present invention.
Figure 33:
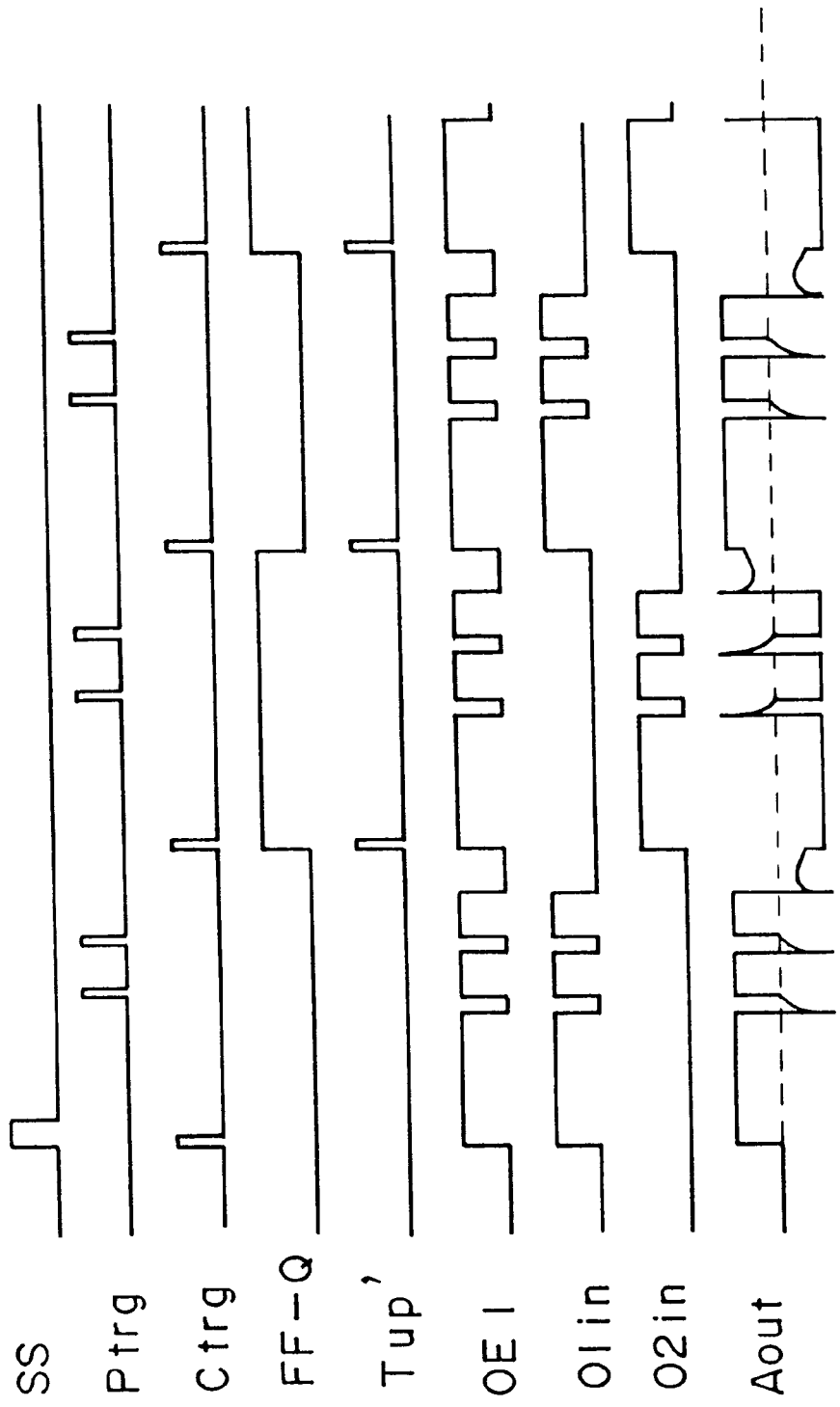
FIG. 33 is a waveform chart showing the operation of the driving system in FIG. 32.

The seventh embodiment of the present invention will be described. FIG. 32 is a block diagram showing the arrangement of the seventh embodiment. A description of parts common to the fourth embodiment will be omitted. FIG. 33 is a waveform chart showing the operation in FIG. 32.

This embodiment is another modification of the fourth embodiment described above. In the fourth embodiment, the pulse control circuit 27 outputs the signal Ctrg or Ptrg only when it receives the signal Tup' from the timer circuit B 32. In the sixth embodiment, a pulse control circuit 27 outputs the signal Ptrg immediately after it receives the signal PE or NE from a pole position detection circuit 40', and outputs the signal Ctrg when it receives the signal Tup' from a timer circuit B 32 without receiving any signal PE or NE from the pole position detection circuit 40'.

In this embodiment, the signals PE and NE from the pole position detection circuit 40' are input to the timer circuit B 32 to reset the timer. The remaining operation is the same as that in the fourth embodiment, and a description thereof will be omitted.

According to this embodiment, as is apparent from FIG. 33, the counter electromotive voltage detection time can be further shortened to more rapidly accelerate and stably rotate the motor.

Figure 34:
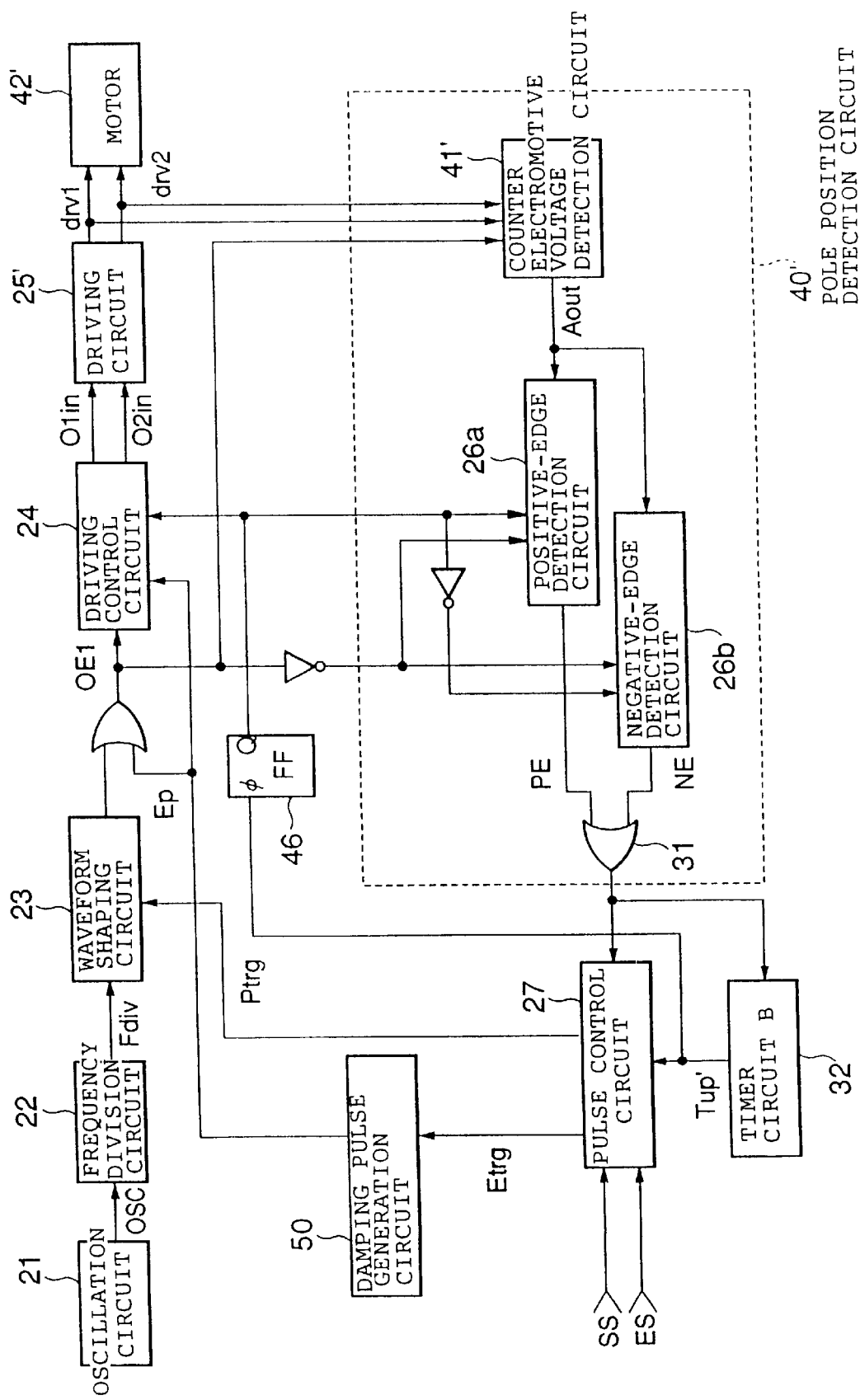
FIG. 34 is a block diagram showing the eighth embodiment of the driving system in the motor driving apparatus of the present invention.
Figure 35:
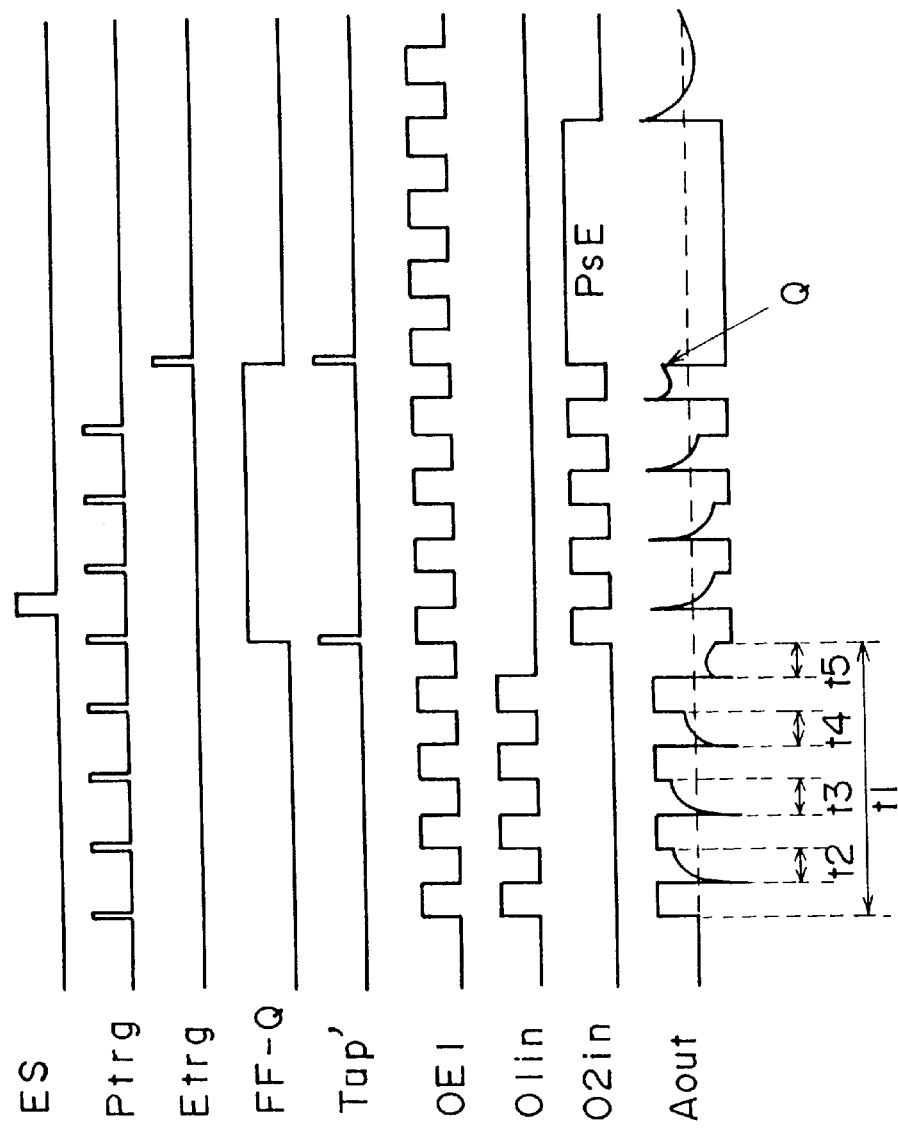
FIG. 35 is a waveform chart showing the operation of the driving system in FIG. 34.

The eighth embodiment of the present invention will be described. FIG. 34 is a block diagram showing the arrangement of the eighth embodiment. A description of parts common to the second embodiment will be omitted. FIG. 35 is a waveform chart showing the operation in FIG. 34.

This embodiment is associated with damping control in stopping the motor. A damping pulse generation circuit 50 is added to the arrangement of the second embodiment shown in FIG. 18.

A pulse control circuit 27 normally outputs the signal Ptrg upon reception of the signal Tup'. When it receives the stop signal ES, it outputs a signal Etrg. Upon reception of the signal Etrg, the damping pulse generation circuit 50 outputs an "H" signal Ep. The signal Ep is input as the signal OE1 to a driving control circuit 24 through an OR circuit. The signal Ep is directly input to the driving control circuit 24, and used to determine whether the signal O1in or O2in is output. That is, the signal OE1 is normally output as the signal O1in when the output signal Q from a flip-flop circuit 46 is at "L", and as the signal O2in when the output signal Q is at "H". When the signal Ep is at "H", this output destination is reversed.

Referring to FIG. 35, after the pulse control circuit 27 receives the stop signal ES, it receives the signal Tup' at the time Q to output the signal Etrg. After the time Q, the output signal Q from the flip-flop circuit 46 is at "L". At this time, since the signal Ep is at "H", a damping pulse signal PSE is output as O2in.

According to this embodiment having this arrangement, the motor can be more quickly stopped at a desired position.

As has been described above, according to the present invention, more reliable starting characteristics of the motor can be attained by the first and second embodiments, while more rapid acceleration and stable rotation performance can be attained by the third embodiment. Although the first, second, and third embodiments have separately been described, they can be combined to realize a higher-performance motor driving circuit. In the present invention, high-speed, large-torque rotation driving of the motor can be realized by a simple system arrangement without changing the structure of a conventional flat bipolar motor.

INDUSTRIAL APPLICABILITY

The present invention can be utilized for every electronic device using a motor, in addition to an electronic timepiece. Its utility value is particularly high in electronic devices which require a size reduction. The present invention exhibits an enhanced effect on a size reduction in motor driving apparatus and a decrease in power consumption.

We claim:

1. A motor driving apparatus comprising a stepping motor constituted by a stator with at least two poles, a rotor having a permanent magnet with at least two poles, and a driving coil magnetically coupled to said stator, driving pulse generation means for outputting a driving pulse signal for driving said stepping motor, a driving circuit for supplying a driving current to said driving coil on the basis of the signal from said driving pulse generation means, a voltage detection circuit for detecting a counter electromotive voltage generated upon rotation of said rotor, and pole position detection means for detecting a pole position of said rotating rotor with respect to said rotor on the basis of a detection signal generated by said voltage detection circuit, said driving pulse generation means controlling an output timing of the driving pulse signal on the basis of the detection signal from said pole position detection means, characterized in that said pole position detection means stops outputting the driving pulse signal on the basis of the detection signal from said voltage detection circuit which is detected during an output period of the driving pulse signal, and outputs a driving pulse signal having a phase opposite to that of the driving pulse signal.

2. A motor driving apparatus according to claim 1, characterized in that the pole position is detected by detecting the counter electromotive voltage generated at a detection coil coaxially wound on said driving coil by using said pole position detection means.

3. A motor driving apparatus according to claim 2, characterized in that the pole position is detected on the basis of a result of comparison between the counter electromotive voltage detected by said pole position detection means and a predetermined potential.

4. A motor driving apparatus according to claim 3, characterized in that the predetermined potential for detecting the pole position includes a plurality of set potentials.

5. A motor driving apparatus according to claim 1, characterized in that said voltage detection circuit is constituted by bias means for biasing a potential level at one terminal of said driving coil to an intermediate potential of a power supply voltage, and a voltage detection circuit for detecting a counter electromotive voltage generated at the other terminal of said driving coil, said driving pulse generation means outputs a driving pulse signal constituted by an intermittent pulse group having a plurality of idle periods, and said pole position detection means stops the driving pulse signal on the basis of a result of comparison between the detection signal from said voltage detection circuit which is detected during the plurality of idle periods, and the intermediate potential, and outputs a driving pulse signal having a phase opposite to that of the stopped driving pulse.

6. A motor driving apparatus according to claim 5, characterized in that the pole position is detected on the basis of crossing of the counter electromotive voltage detected by said pole position detection means over a predetermined potential.

7. A motor driving apparatus according to claim 6, characterized in that the predetermined potential for detecting the pole position includes a plurality of set potentials.

8. A motor driving apparatus according to claim 5, characterized in that the driving pulse signal constituted by the intermittent pulse group is constituted by a plurality of pulse groups having different pulse widths.

9. A motor driving apparatus according to claim 8, characterized in that the driving pulse signal constituted by the intermittent pulse group is constituted by a first pulse having a large pulse width, and a second pulse group having a pulse width smaller than that of the first pulse.

10. A motor driving apparatus according to claim 9, characterized in that the pulse width of the first pulse changes in accordance with a rotation speed of said rotor.

11. A motor driving apparatus according to claim 9, characterized in that the pulse width of the first pulse changes in accordance with the output number of driving pulses upon start of said rotor.

12. A motor driving apparatus according to claim 9, characterized in that the pulse width of the second pulse changes in accordance with a rotation speed of said rotor.

13. A motor driving apparatus according to claim 9, characterized in that the pulse width of the second pulse changes in accordance with the output number of driving pulses upon start of said rotor.

14. A motor driving apparatus according to claim 10, characterized in that the first pulse changes to decrease the pulse width along with an increase in rotation speed of said rotor.

15. A motor driving apparatus according to claim 11, characterized in that the first pulse changes to decrease the pulse width along with an increase in number of output driving pulses upon the start of said rotor.

16. A motor driving apparatus according to claim 12, characterized in that the second pulse changes to decrease the pulse width along with an increase in rotation speed of said rotor.

17. A motor driving apparatus according to claim 13, characterized in that the second pulse changes to decrease the pulse width along with an increase in number of output driving pulses upon the start of said rotor.

18. A motor driving apparatus according to claim 5, characterized in that the idle period widths of the plurality of idle periods of the driving pulse signal constituted by the intermittent pulse group change in accordance with a rotation speed of said rotor.

19. A motor driving apparatus according to claim 5, characterized in that the idle period widths of the plurality of idle periods of the driving pulse signal constituted by the intermittent pulse group change in accordance with the number of output pulses upon start of said rotor.

20. A motor driving apparatus according to claim 18, characterized in that the idle period widths change to decrease the widths along with an increase in rotation speed of said rotor.

21. A motor driving apparatus according to claim 19, characterized in that the idle period widths change to decrease the widths along with an increase in number of output driving pulses upon the start of said rotor.

22. A motor driving apparatus according to claim 1, characterized in that said motor driving apparatus comprises a timer circuit for measuring a predetermined time after said driving pulse generation means outputs a starting pulse, and then generating a timer signal, and when no detection signal is generated by said pole position detection means the predetermined time after output of the starting pulse is started, said driving pulse generation means stops outputting the starting pulse in accordance with a timer signal output from said timer circuit, and outputs a driving pulse signal having a phase opposite to that of the starting pulse.

23. A motor driving apparatus comprising a stepping motor constituted by a stator with at least two poles, a rotor having a permanent magnet with at least two poles, and a driving coil magnetically coupled to said stator, driving pulse generation means for outputting a driving pulse signal for driving said stepping motor, a driving circuit for supplying a driving current to said driving coil on the basis of the signal from said driving pulse generation means, a voltage detection circuit for detecting a counter electromotive voltage generated upon rotation of said rotor, and pole position detection means for detecting a pole position of said rotating rotor with respect to said rotor on the basis of a detection signal generated by said voltage detection circuit, said driving pulse generation means controlling an output timing of the driving pulse signal on the basis of the detection signal from said pole position detection means, characterized in that said motor driving apparatus further comprises a timer circuit for generating a timer signal a predetermined time after said driving pulse generation means outputs the driving pulse signal, and when no detection signal is generated by said pole position detection means the predetermined time after output of the driving pulse signal is started, said driving pulse generation means sets a pulse width of a driving pulse signal to be output next to smaller than that of the previously output driving pulse signal.

24. A motor driving apparatus according to claim 23, characterized in that, when no detection signal is generated from said pole position detection means the predetermined time after output of the driving pulse signal is started, said driving pulse generation means outputs a compensation pulse signal having a polarity opposite to that of the driving pulse signal.

25. A motor driving apparatus according to claim 24, characterized in that the compensation pulse signal has a pulse width smaller than that of the driving pulse signal.

26. A motor driving apparatus according to claim 23, characterized by further comprising damping pulse generation means for outputting a damping pulse signal in order to stop rotating said stepping motor, said damping pulse generation means controlling an output timing of the damping pulse signal on the basis of the detection signal from said pole position detection means.

27. A motor driving apparatus according to claim 26, characterized in that the damping pulse signal is output in a direction in which said stator is excited to a polarity opposite to a magnetic pole of said rotor.

28. A motor driving apparatus according to claim 26, characterized in that the damping pulse signal is output with a pulse width larger than that of the driving pulse signal for driving said stepping motor.

29. A motor driving apparatus according to claim 1, characterized by further comprising damping pulse generation means for outputting a damping pulse signal in order to stop rotating said stepping motor, said damping pulse generation means controlling an output timing of the damping pulse signal on the basis of the detection signal from said pole position detection means.

* * * * *